United States Patent [19]
De Almeida

[11] Patent Number: 6,112,051
[45] Date of Patent: Aug. 29, 2000

[54] RANDOM PROBLEM GENERATOR

[75] Inventor: Victor James De Almeida, Alvin, Tex.

[73] Assignee: Fogcutter, LLC, Midland, Tex.

[21] Appl. No.: 08/968,538

[22] Filed: Nov. 12, 1997

Related U.S. Application Data

[60] Provisional application No. 60/031,673, Nov. 22, 1996.

[51] Int. Cl.[7] .................................................... G09B 7/00
[52] U.S. Cl. ........................... 434/362; 434/322; 434/350; 434/118; 434/298; 345/507; 707/100; 707/102; 707/103; 707/104; 706/927
[58] Field of Search ..................................... 434/322, 323, 434/362, 350, 118, 208, 169; 355/500, 502, 506, 561, 752, 753, 754, 755, 756, 757, 758, 759, 760; 345/501, 502, 507, 506; 707/100, 104, 102, 101, 103; 706/927

[56] References Cited

U.S. PATENT DOCUMENTS

| | | | |
|---|---|---|---|
| 2,085,881 | 7/1937 | Van Doren | 35/18 |
| 4,388,448 | 6/1983 | Melby | 525/327.3 X |
| 4,481,167 | 11/1984 | Ginter et al. | 422/29 X |
| 4,908,758 | 3/1990 | Sanders | 364/300 X |
| 5,265,029 | 11/1993 | Ramsay | 364/496 X |
| 5,326,270 | 7/1994 | Ostby et al. | 434/362 X |
| 5,441,415 | 8/1995 | Lee et al. | 434/350 X |
| 5,456,607 | 10/1995 | Antoniak | 434/323 X |
| 5,725,384 | 3/1998 | Ito et al. | 434/350 X |
| 5,743,746 | 4/1998 | Ho et al. | 434/332 X |
| 5,795,156 | 8/1998 | Redford et al. | 434/118 X |
| 5,810,599 | 9/1998 | Bishop | 434/157 X |
| 5,829,983 | 11/1998 | Koyama et al. | 434/118 X |
| 5,863,208 | 1/1999 | Ho et al. | 434/362 |
| 5,944,530 | 8/1999 | Ho et al. | 434/236 |

*Primary Examiner*—Jessica J. Harrison
*Assistant Examiner*—Binh-An Nguyen
*Attorney, Agent, or Firm*—Christopher L. Makay

[57] ABSTRACT

A random problem generator selects a formula from a database of formulas, randomly generates an initial condition necessary to solve the selected formula, and generates a question involving the selected formula and the randomly generated initial condition. A random problem generator further randomly selects a cation from a table of cations, retrieves the cation name from the table of cations, randomly selects an anion from a table of anions, and retrieves the anion name from the table of anions. The random problem generator balances the charges of the cation and the anion and determines the subscripts for the cation and the anion. The random problem generator places the cation and anion together to form a chemical formula and the cation name and anion name together to form a chemical name. The random problem generator additionally generates either a question supplying the chemical name and asking for the chemical formula or supplying the chemical formula and asking for the chemical name.

30 Claims, 26 Drawing Sheets

| copper (I) | cobre (I) |
| Cu | |
| +1 | |
| | |
| copper | cobre |
| Co | |
| | |
| mouoatomic | |

| bromide | bromuro |
| Br | |
| -1 | |
| | |
| bromate | bromato |
| BrO$_3$ | |
| | |
| mouoatomic | |

RANDOM PROBLEM GENERATOR

This application claims the benefit of U.S. Provisional Application No. 60/031,679, filed Nov. 22, 1996.

BACKGROUND OF THE INVENTION

1. Field of the Invention

The present invention relates to problem generators and more particularly, but not by way of limitation, to a problem generator capable of generating vast numbers of unique, random problems.

2. Description of the Related Art

In education, students solve problems to enhance and test their educational skill levels. Testing materials that the students read and answer include books and testing questionnaires. Recent advances in electronics have computerized these testing materials to eliminate teacher generated testing materials and to provide the student with immediate feedback.

A computer learning apparatus is disclosed in U.S. Pat. No. 5,441,415, issued to Lee et al., on Aug. 15, 1995. The Lee system includes a work station, a database, and a computer. The computer accesses a plurality of lessons covering a variety of educational subjects from the database. The lessons have many styles, including voice, audio, pictures, animation, and symbolism, and cover a variety of comprehension levels within each subject.

Once the student has completed the first lesson, the system determines the student's comprehension level by using an expert system, or alternatively, a teacher overseeing the student's results. Once the student's comprehension level is determined, a second lesson that corresponds to the student's comprehension level is given.

The Lee system, however, suffers several disadvantages. If a student requires multiple tutorials to master a specific lesson, the student potentially sees repetitive questions. The Lee system retrieves questions from a database for creating lessons for students. If a student repeatedly works a comprehension level of a particular subject, unique problems may become exhausted. This repetition potentially permits a student to obtain an artificially high score, thereby allowing the student to pass the lesson without mastering the material.

Furthermore, as problems become exhausted, the teacher must spend time creating and entering new problems to the database or funds must be spent to purchase additional problems for the database. Moreover, sometimes a new database or tutorial aid must be purchased altogether. These drawbacks waste the teacher's time and/or the school's financial resources.

One possible solution is to increase the size of the database. Unfortunately, increasing the database's size renders it unsuitable for storing on a hard drive or diskette, or transferring over a network, such as the Internet.

Accordingly, a problem generator that creates of large numbers of random problems, will improve over conventional computerized educational systems.

SUMMARY OF THE INVENTION

In accordance with the present invention, a random problem generator selects a formula from a database of formulas, randomly generates an initial condition necessary to solve the selected formula, and generates a question involving the selected formula and the randomly generated initial condition. The random problem generator displays or prints the question involving the selected formula and the randomly generated initial condition. The random problem generator further generates an answer to the question involving the selected formula and the randomly generated initial condition and compares the answer input by a user to the generated answer. When the user input answer is incorrect, the random problem generator displays the question completely solved.

A random problem generator randomly selects a cation from a table of cations, retrieves the cation name from the table of cations, randomly selects an anion from a table of anions, and retrieves the anion name from the table of anions. The random problem generator balances the charges of the cation and the anion and determines the subscripts for the cation and the anion. The random problem generator further places the cation and anion together to form a chemical formula and the cation name and anion name together to form a chemical name. The random problem generator still further generates either a question supplying the chemical name and asking for the chemical formula or supplying the chemical formula and asking for the chemical name.

It is, therefore, an object of the present invention to provide a problem generator capable of generating vast numbers of unique, random problems.

Another object of the present invention is to provide a random problem generator that is storable on storage media, such as a hard drive or diskettes, and transferable from a central location over a network, such as the Internet, to personal computers or terminals.

A further object of the present invention is to provide a random problem generator that uses computer checks to virtually eliminate repetition of questions to students.

Still other objects, features, and advantages of the present invention will become evident to those of ordinary skill in the art in light of the following.

DETAILED DESCRIPTION OF THE PREFERRED EMBODIMENT

Figures 1, 2A, 2B:
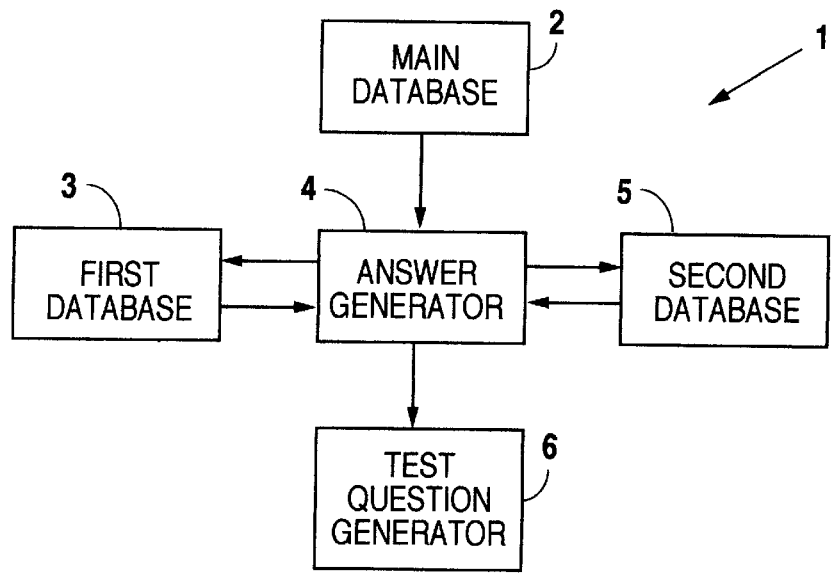
FIG. 1 is a block diagram of the random problem generator.
FIG. 2A is an example of the information associated with each cation.
FIG. 2B is an example of the information associated with each anion.

Referring to FIG. 1, a random problem generator 1 includes a first database 3, a second database 4, an answer generator 5, and a test question generator 6. The random problem generator 1 is stored on a CD ROM, diskette, or other suitable machine readable storage media. The random problem generator 1 may be practiced in any suitable hardware configuration such as a personal computer or laptop computer having a display, keyboard, processor, and memory. For ease of explanation, the following describes the random problem generator 1 as generating problems, however, in actuality the random problem generator 1 is a computer program that controls and directs the computer's processor to generate problems.

The answer generator 5 controls the processor to retrieve data from a main database 2 to create the first database 3 and second database 4. The main database 2 is stored on a diskette, CD ROM, or other suitable machine readable media so that it may be read into the computer's memory. The main database 2 is divided in sections according to educational related subjects, such as math, physics, chemistry, or geography, for generating test problems in subject areas. These subject areas further subdivide into sections (e.g. cation and anions for the chemistry section) that are retrieved for generating the first and second databases 3 and 4.

To create the first and second databases 3 and 4, the answer generator 5 first controls the processor to read the cation data from the main database 2. As the cations are read, they are sequentially assigned numbers. The answer generator 5 controls the processor to track the number of cations which becomes the upper limit for the problem generator. The answer generator 5 then controls the processor to read the anion data from the main database 2. As the anions are read, they are sequentially assigned numbers. The answer generator 5 controls the processor to track the number of anions which becomes the upper limit for the problem generator. After creating the first and second databases 3 and 4, the answer generator 5 controls the processor to store the first and second databases 3 and 4 in the computer's memory for use in generating the correct and incorrect answers.

Although two databases 3 and 4 are illustrated, it should be understood that multiple databases may be built for use by the answer generator 5. The answer generator 5 controls the processor to randomly retrieve and combine data from the first database 3 and second database 4 for creating and assembling correct and incorrect answers into a table or array. The test question generator 6 controls the processor to use the table or array for creating a test question. The random problem generator 1 may be utilized to generate test questions relating to any educational subject, such as physics, math chemistry, geography, etc. and, therefore, should not be limited to the following specific example.

Figure 21:
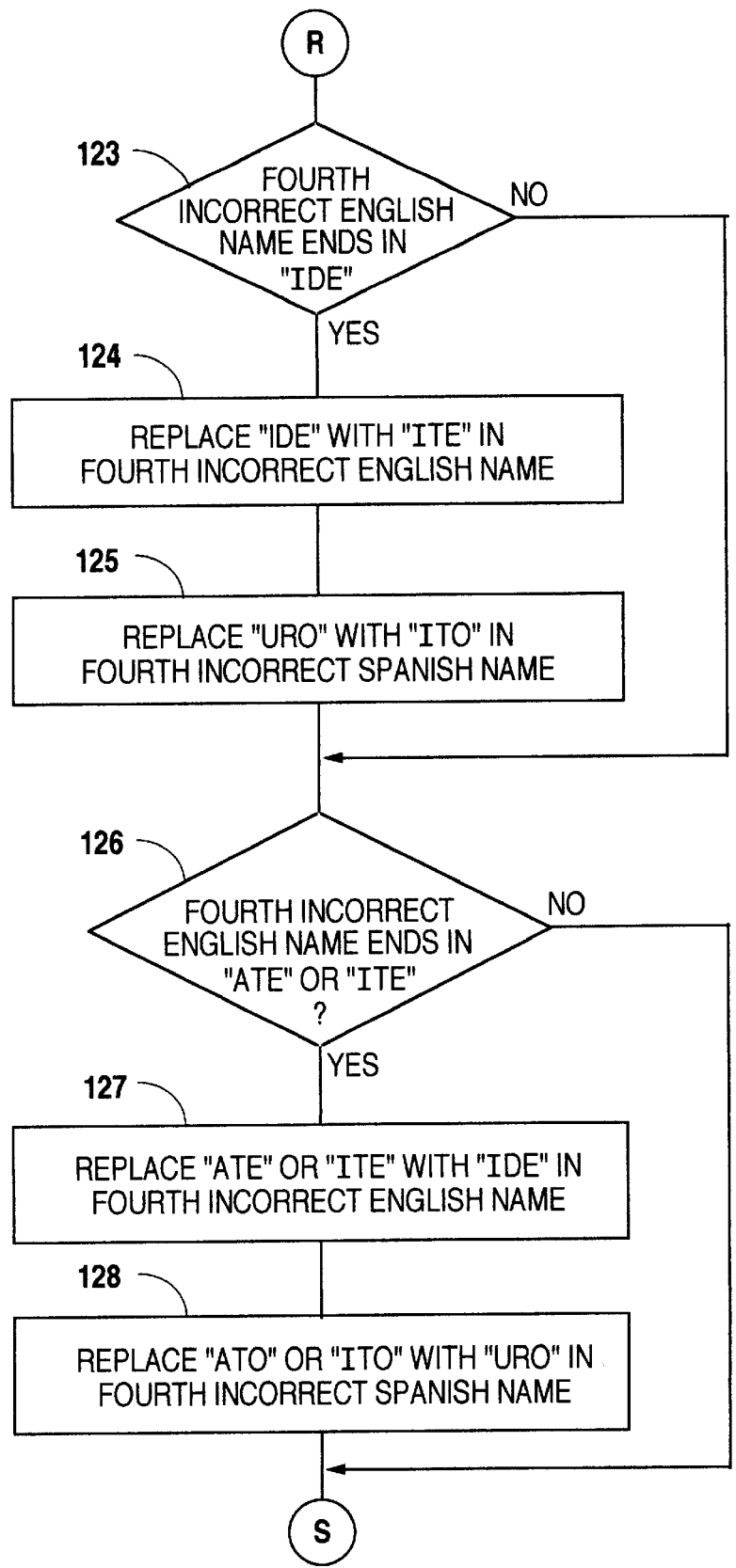
Figure 22:
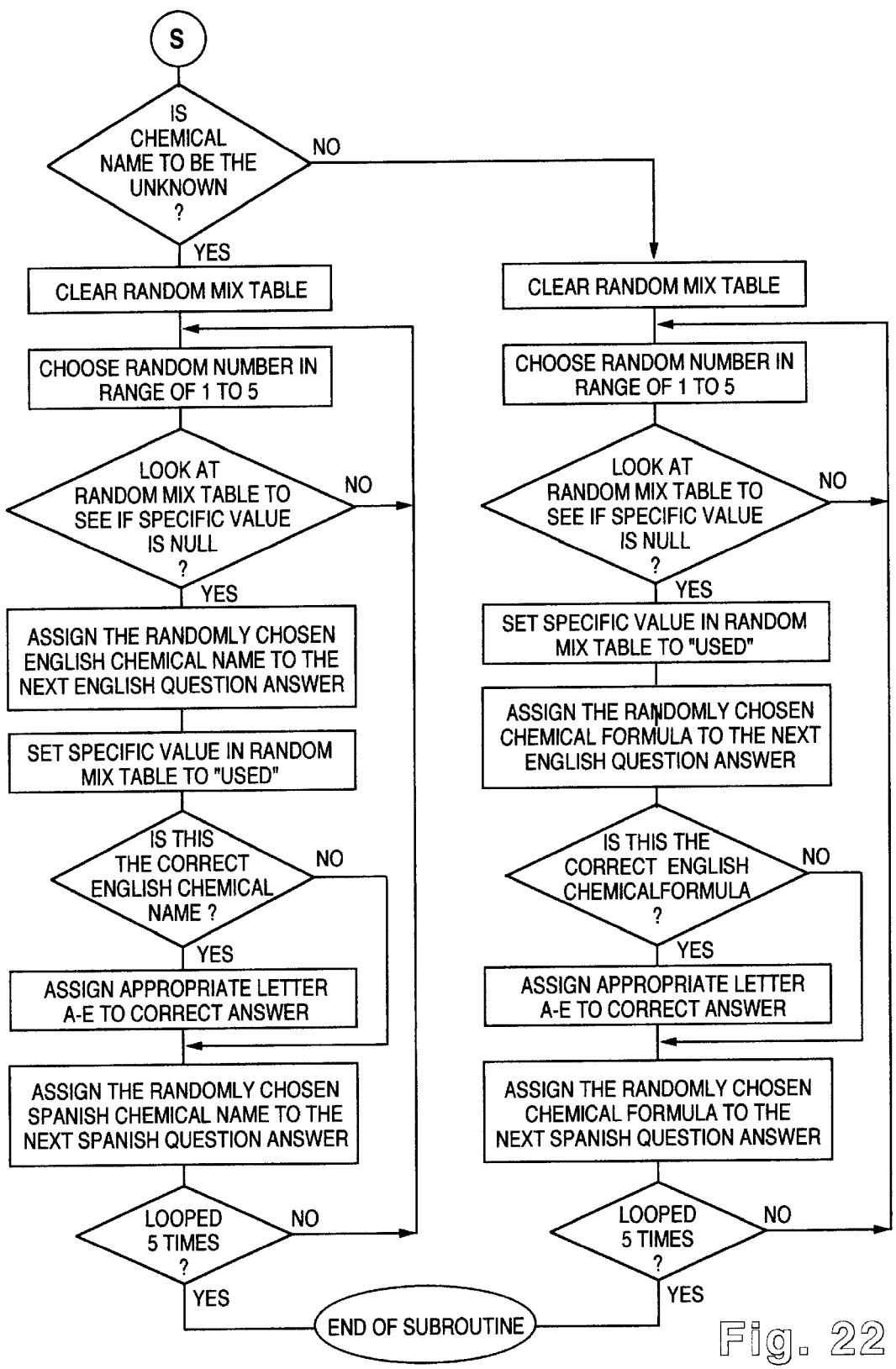
FIG. 22 is a flow chart illustrating a subroutine that randomizes the generated answers in a particular test question.
Figure 23:
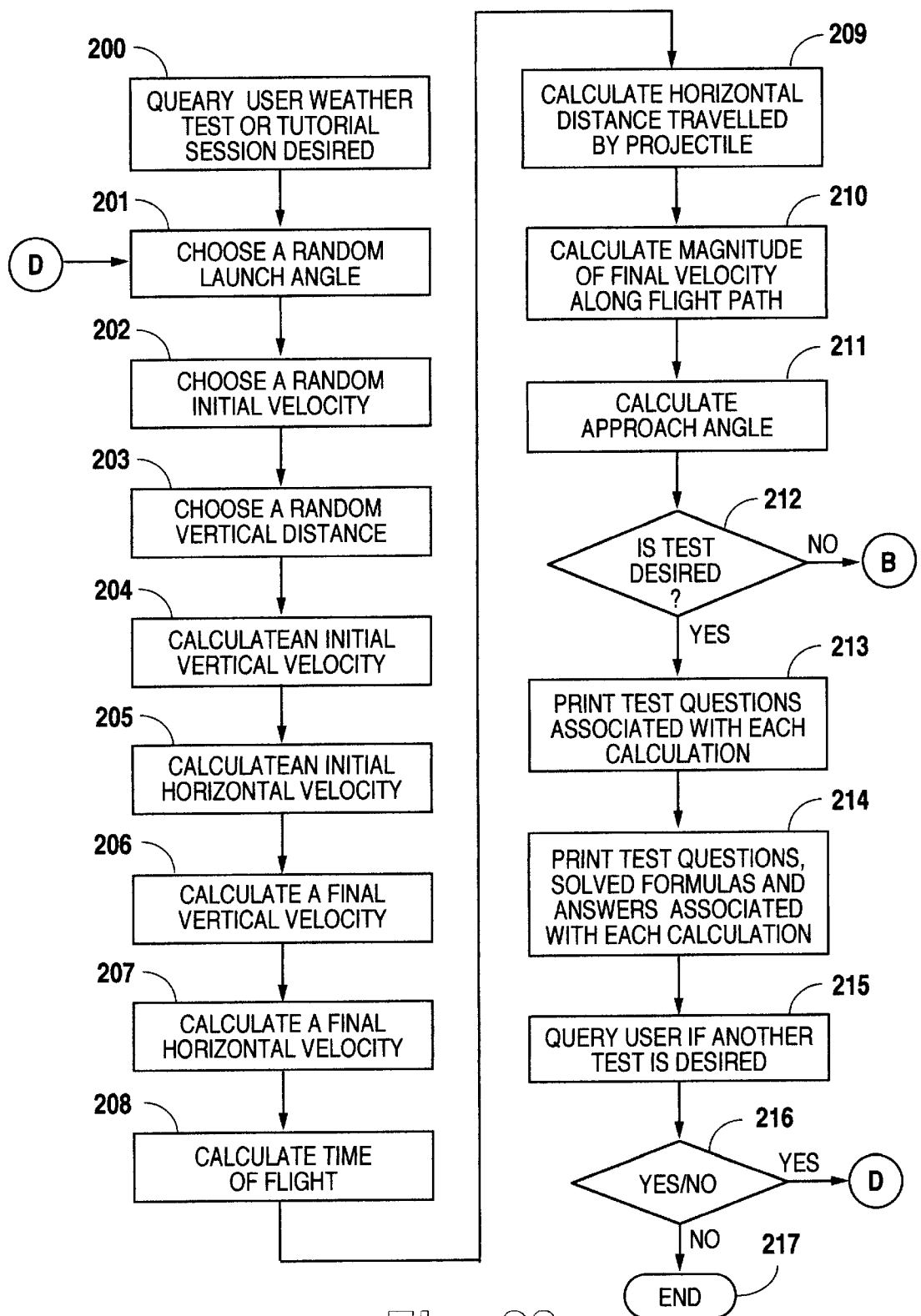
FIGS. 23–27 are a flowchart illustrating a subroutine that randomly generates physics test questions.
Figure 24:
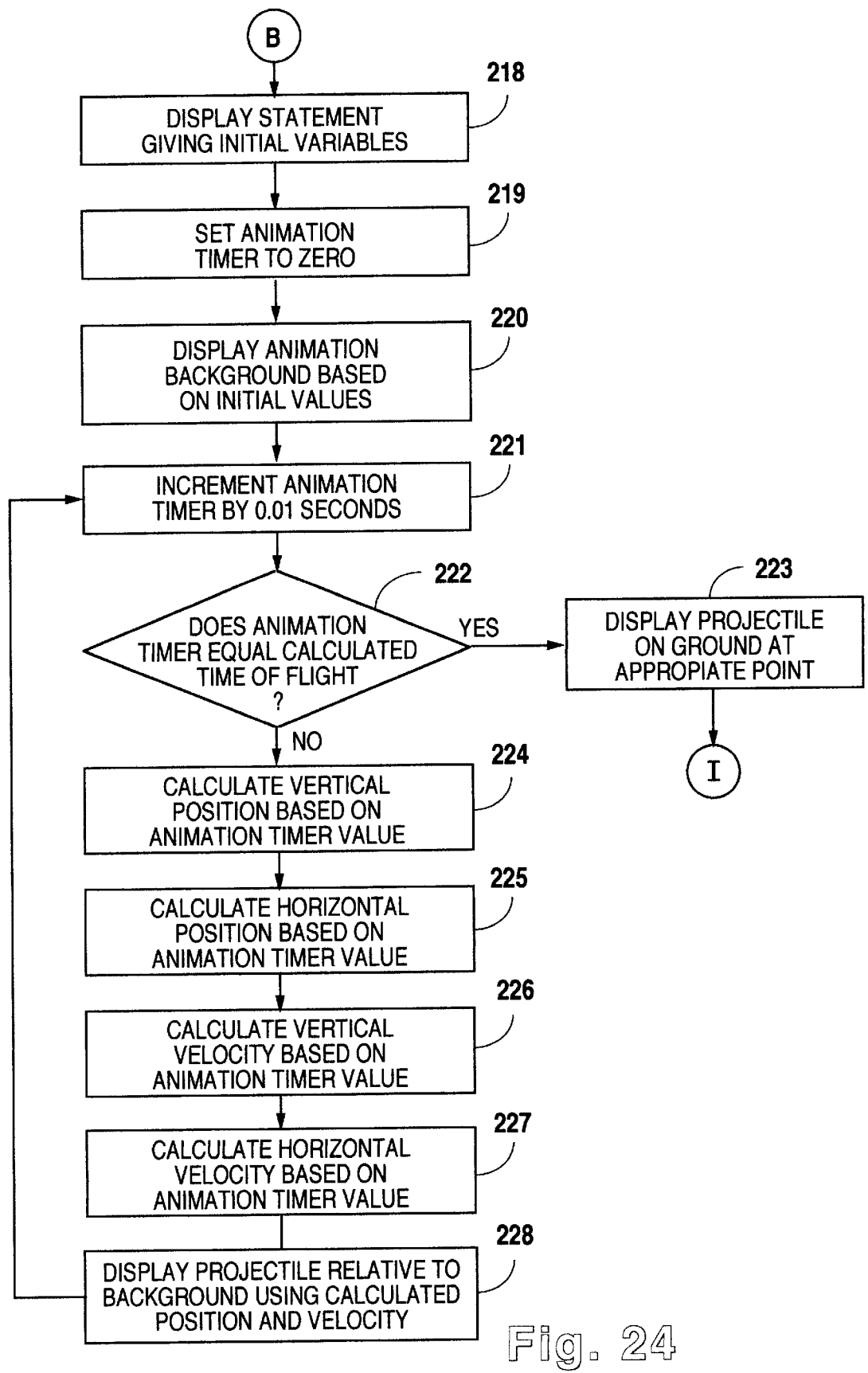
Figure 25:
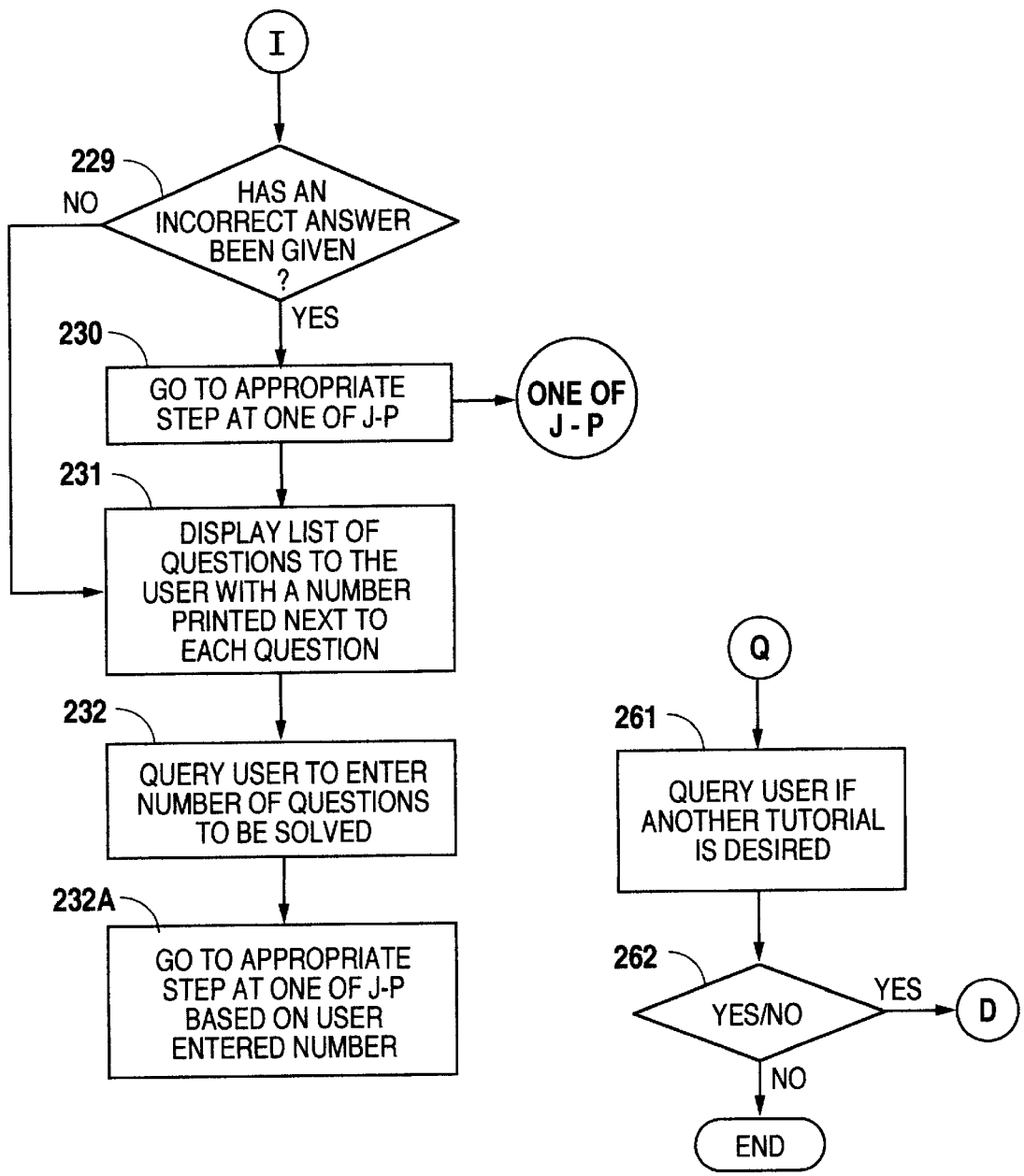
Figure 26:
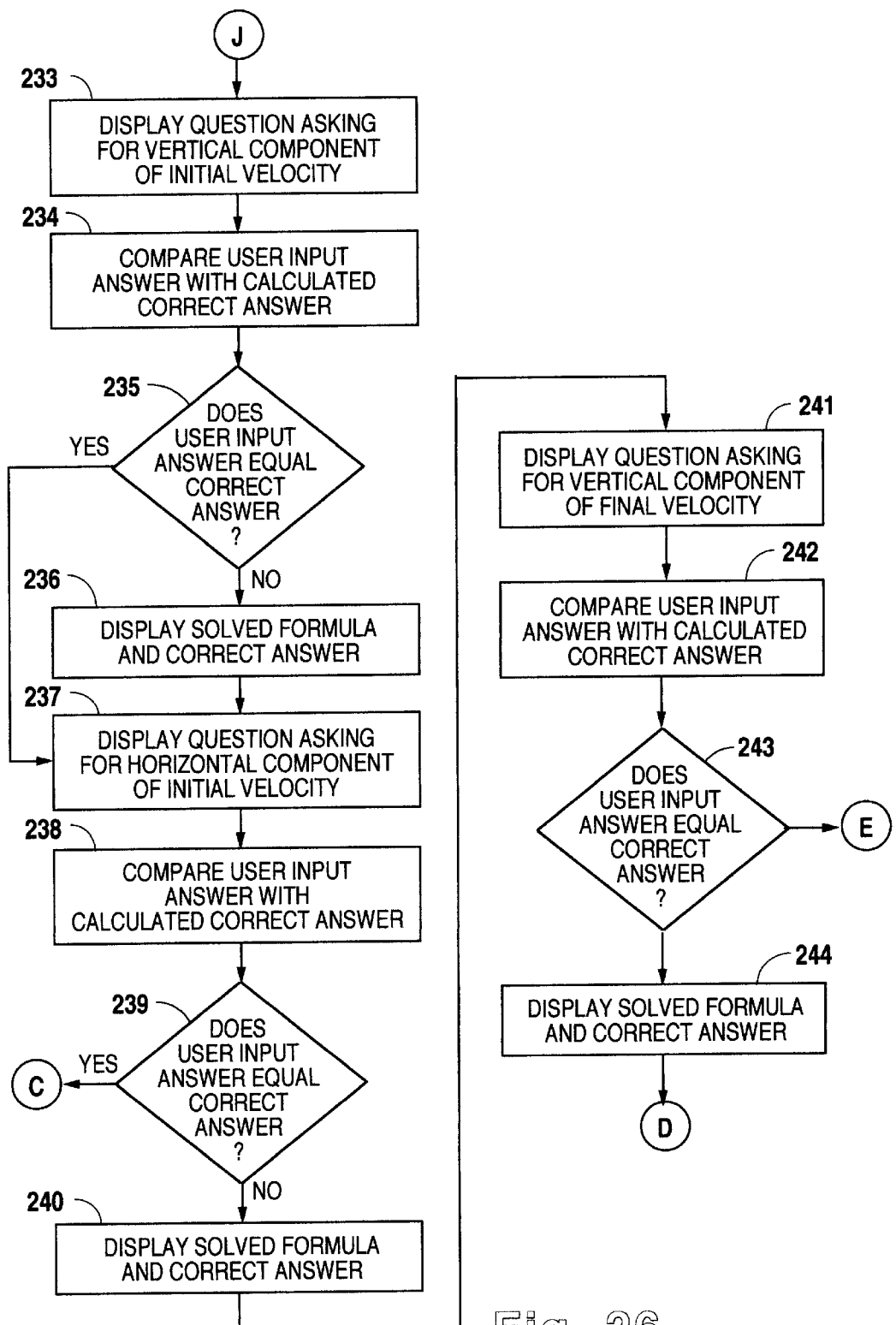
Figure 27:
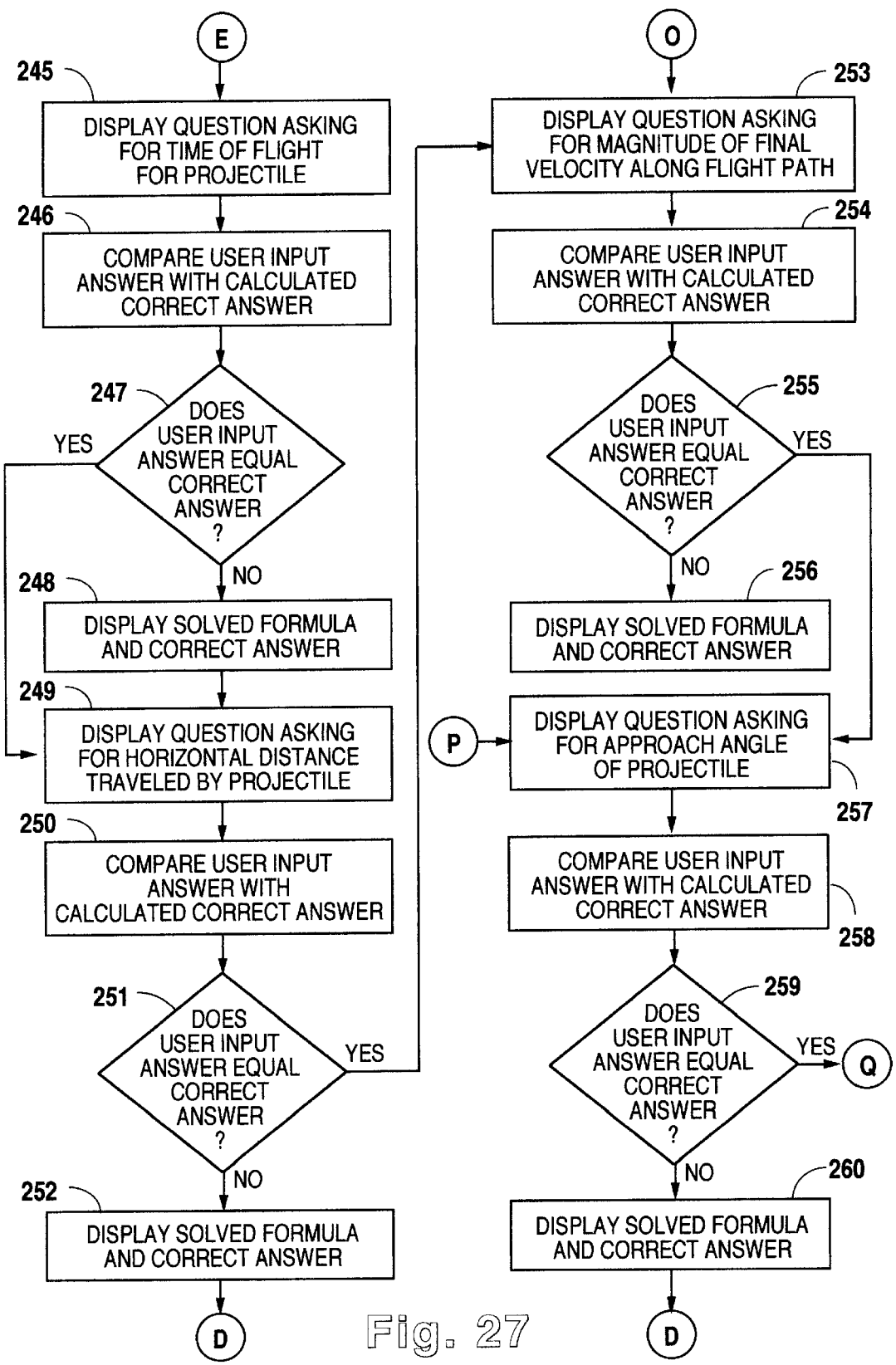

Referring to FIGS. 2A, 2B, and 3–22, an embodiment of the random problem generator 1 generates chemistry test problems. The answer generator 5 that builds the first database 3 and second database 4 and generates correct and incorrect answers is illustrated in FIGS. 3–21. The test question generator 6 is illustrated in FIG. 22.

Figure 3:
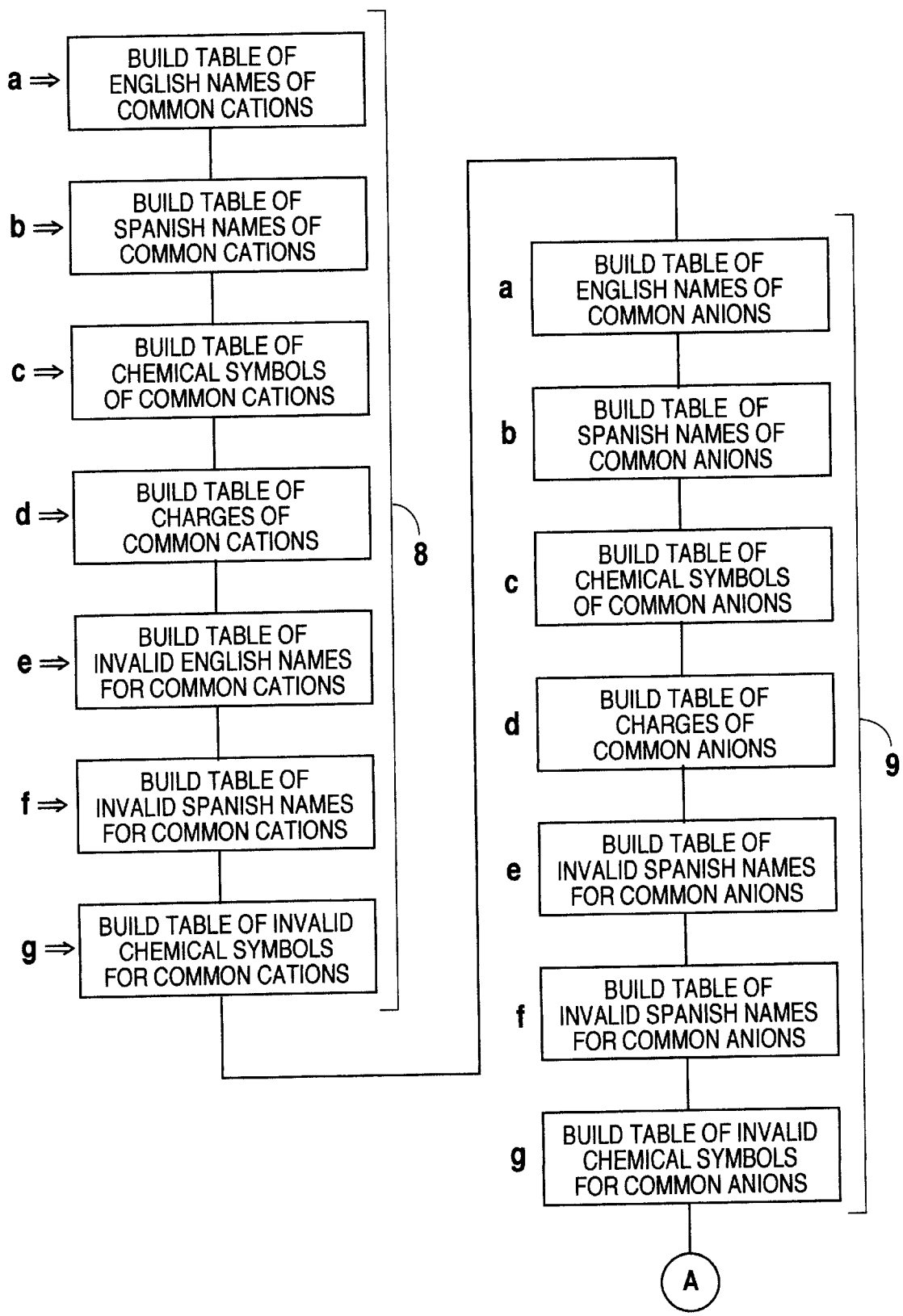
FIGS. 3–21 are a flowchart illustrating a portion of a subroutine that randomly selects a cation and an anion for generating problem answers.

Referring to FIG. 3, the answer generator 5 controls the processor to create the first and second databases 3 and 4. The first database 3 is built in step 8. The processor in step 8a builds the table of English names of common cations and then, in step 8b, builds the table of Spanish names of common cations from the main database as previously described. The processor builds the table of chemical symbols of the common cations in step 8c, and then in step 8d builds the table of charges of the common cations from the main database as previously described. Next, the processor builds the table of invalid English names for common cations in step 8e, and then in step 8f builds the table of invalid Spanish names for common cations from the main database as previously described. In step 8g, the processor builds the table of invalid Spanish symbols for common cations from the main database as previously described, thereby completing the cation tables from the main database as previously described. Thus, the processor builds tables that include the chemical names, charges, symbols, incorrect names, and incorrect symbols for a variety of cations, such as copper(I), sodium, and potassium.

The second database 4 is built in step 9. The processor in step 9a builds the table of English names of common anions and then, in step 9b, builds the table of Spanish names of common anions from the main database as previously described. The processor builds the table of chemical symbols of the common anions in step 9c, and then in step 9d builds the table of charges of the common anions from the main database as previously described. Next, the processor builds the table of invalid English names for common anions in step 9e, and then in step 9f builds the table of invalid Spanish names for common anions from the main database as previously described. In step 9g, the processor builds the table of invalid chemical symbols for common anions from the main database as previously described, thereby completing the anion tables. Thus, the processor builds tables that include the chemical names, charges, symbols, incorrect names, and incorrect symbols for a variety of anions, such as bromide, chloride, and fluoride.

Each ion has its symbol associated with its name, charge, invalid name, and invalid symbol. Examples of information associated with each cation and anion symbol are illustrated in FIGS. 2A and 2B. Referring to FIG. 2A, the cation symbol Cu is associated with its English name copper(I), Spanish name cobre(I) charge +1, invalid English name copper, invalid Spanish name cobre, and invalid symbol Co. In addition, the cation will be indicated as monoatomic or polyatomic. Referring to FIG. 2B, the anion symbol Br is associated with its English name bromide, Spanish name bromuro, charge −1, invalid English name bromate, invalid Spanish name bromato, and invalid symbol BrO3. In addition, the anion will be indicated as monoatomic or polyatomic. The invalid names and symbols are similar to the actual name or symbol of the ion. This similarity permits the answer generator 5 to generate incorrect answers similar to the correct answers, and thereby permits the test generator 6 to create challenging test questions for a student.

Although inorganic anions and cations are shown in the examples, organic anions and cations may also be used. Furthermore, though the chemistry example of the problem generator 1 uses the International Union of Chemist's System for naming chemical compounds, it should be understood that other systems such as the Stock system or the International Union of Pure and Applied Chemistry (IUPAC) may also be used by the random problem generator 1. In addition, the names in the present example are provided for the student in English and Spanish, however, one of ordinary skill in the art will recognize that only one language or languages other than the ones presented may be used.

Figure 4:
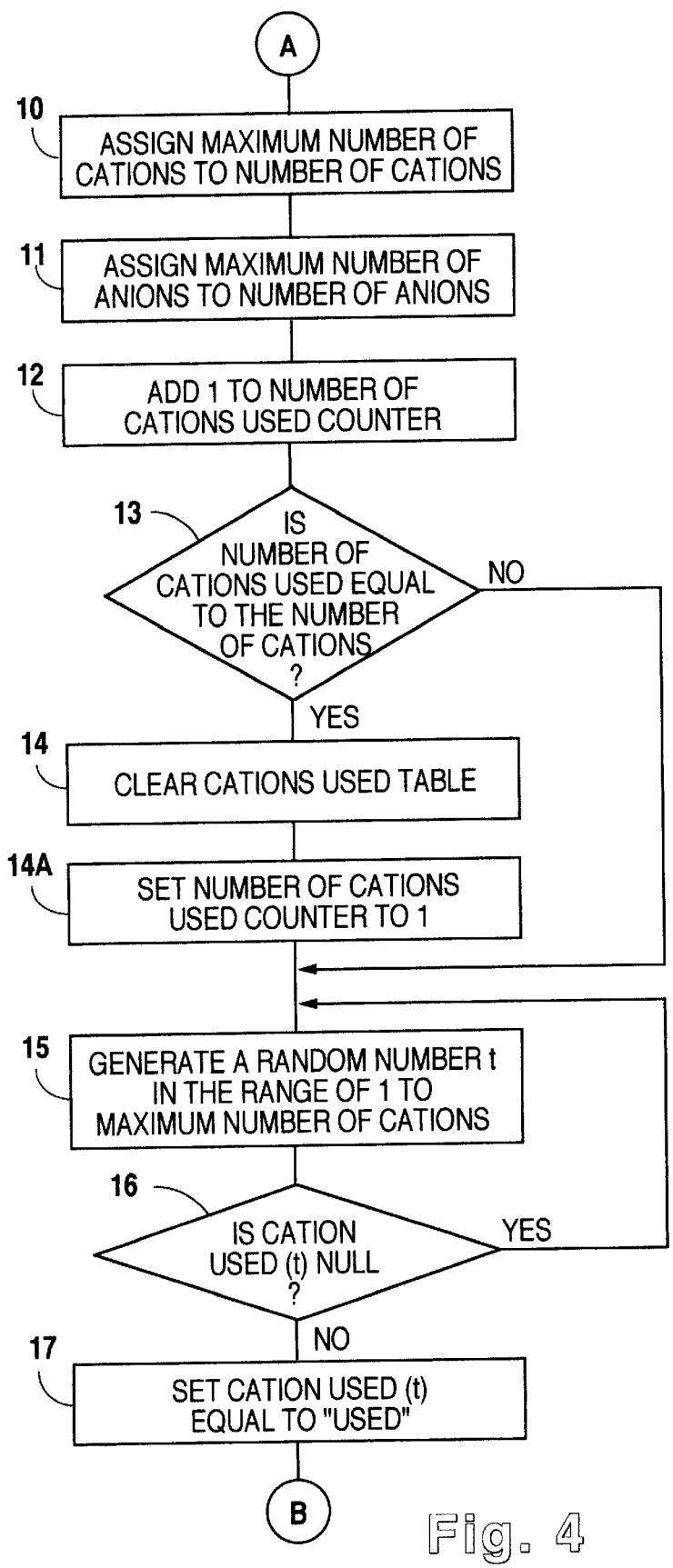
Figure 5:
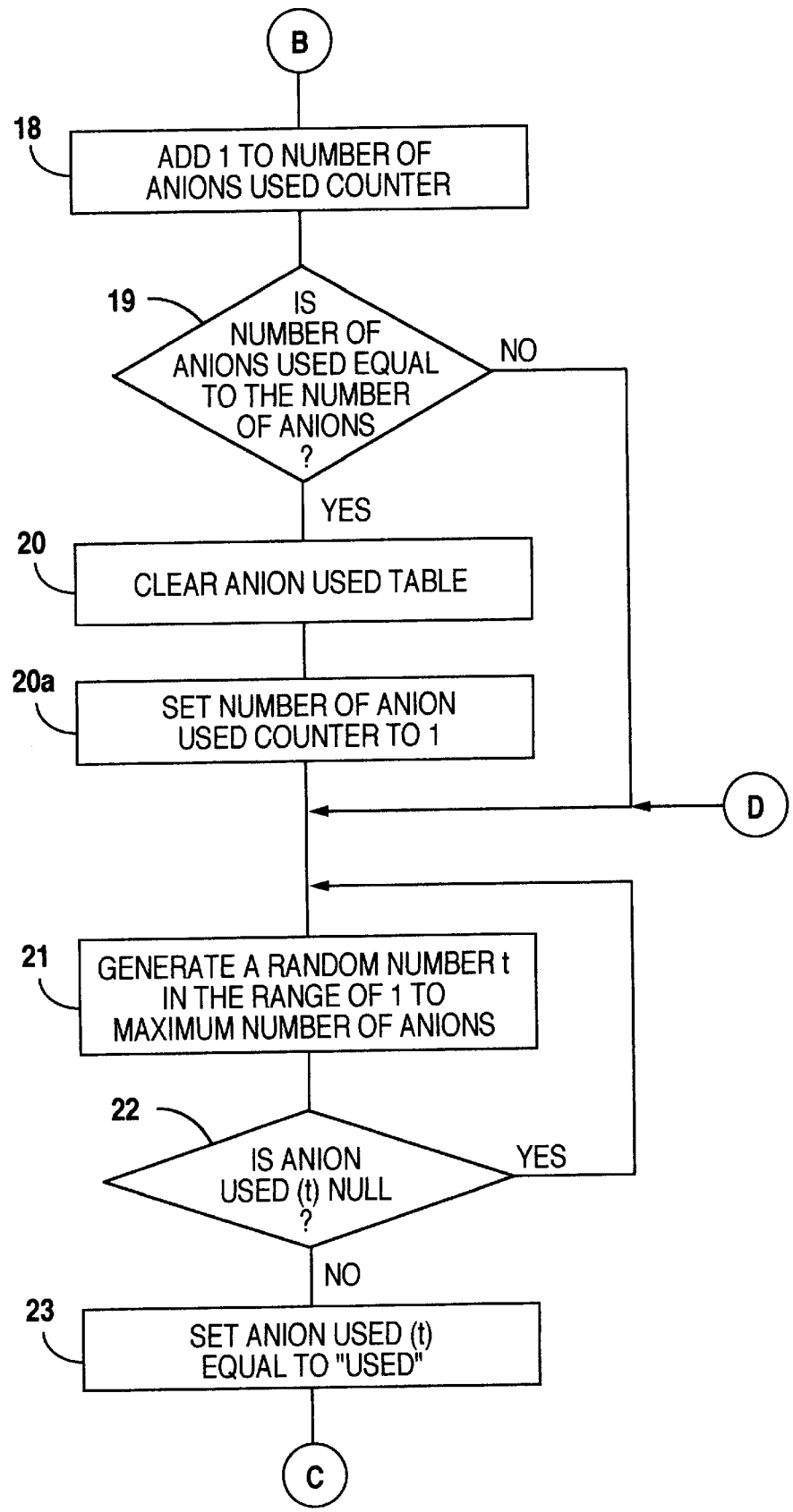

After building the anion and cation tables, the answer generator 5 randomly selects a cation and anion for generating answers. Referring to FIG. 4, the processor assigns the maximum number of cations to the number of cations in step 10 and then assigns the maximum number of anions to the number of anions in step 11. In step 12, the processor adds one to the number of cations used counter. The processor in step 13 determines if the number of cations used is equal to the number of cations. If the number of used cations is not equal to the number of cations, the processor proceeds directly to step 15 (described herein). If the number of used cations is equal to the number of cations, the processor in step 14 clears the cations from the used cation table, and then in step 14a sets the used cation counter to 1. In step 15, the processor, using a technique and program function well-known to those of ordinary skill in the art, generates a random number t in the range of 1 to the maximum number of cations, which was determined when creating the first and second databases 3 and 4 as previously described. Next, the processor in step 16 determines if the cation has been used. If the cation has been used, the processor returns to step 15. If the cation has not been used, the processor sets the used cation number (t) equal to "used" in the cations used table. The cations used table is organized starting with 1 through the maximum number of cations. The "used" designation is placed in the table at the number corresponding to the number assigned to the cation during creation of the database 3. After selecting a cation, the processor starts randomly selecting an anion.

To randomly select an anion, the processor in step 18 adds one to the anion counter. In step 19, the processor determines if the number of anions used is equal to the number of anions. If the number of anions used equals the number of anions, the processor proceeds directly to step 21 (described herein). If the number of anions used is not equal to the number of anions, the processor in step 20 clears the anions used table and, in step 20a, sets the used anion counter back to 1. In step 21, the processor, using a technique and program function well-known to those of ordinary skill in the art, generates a random number t in the range of 1 to the maximum number of anions, which was determined when creating the first and second databases 3 and 4 as previously described. In step 22, the processor determines if the anion is used. If the anion is used, the processor returns to step 21. If the anion has not been used, the processor sets the used anion number (t) equal to "used" in step 23. The anions used table is organized starting with 1 through the maximum number of anions. The "used" designation is placed in the table at the number corresponding to the number assigned to the anion during creation of the database 4.

Figure 6:
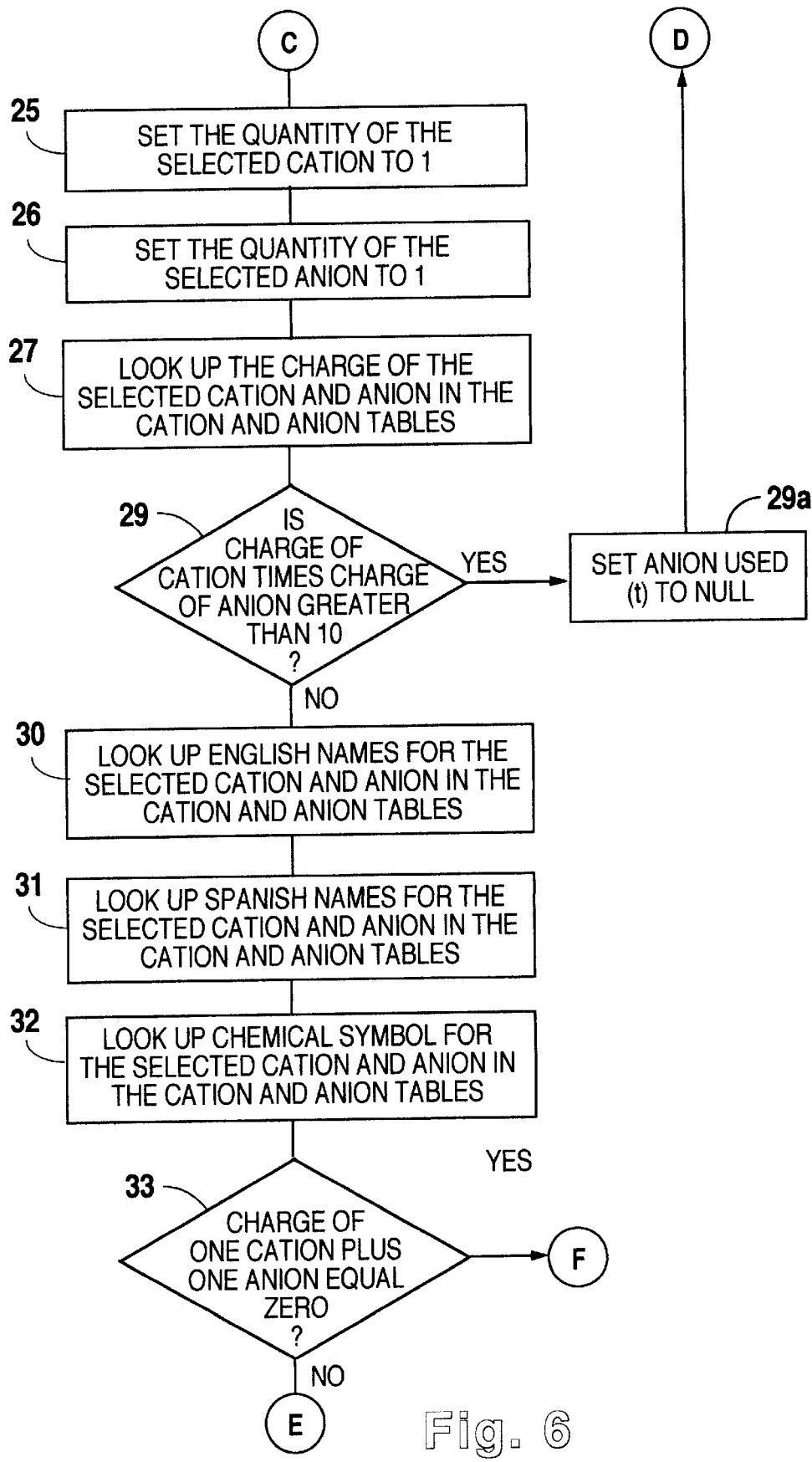
Figure 7:
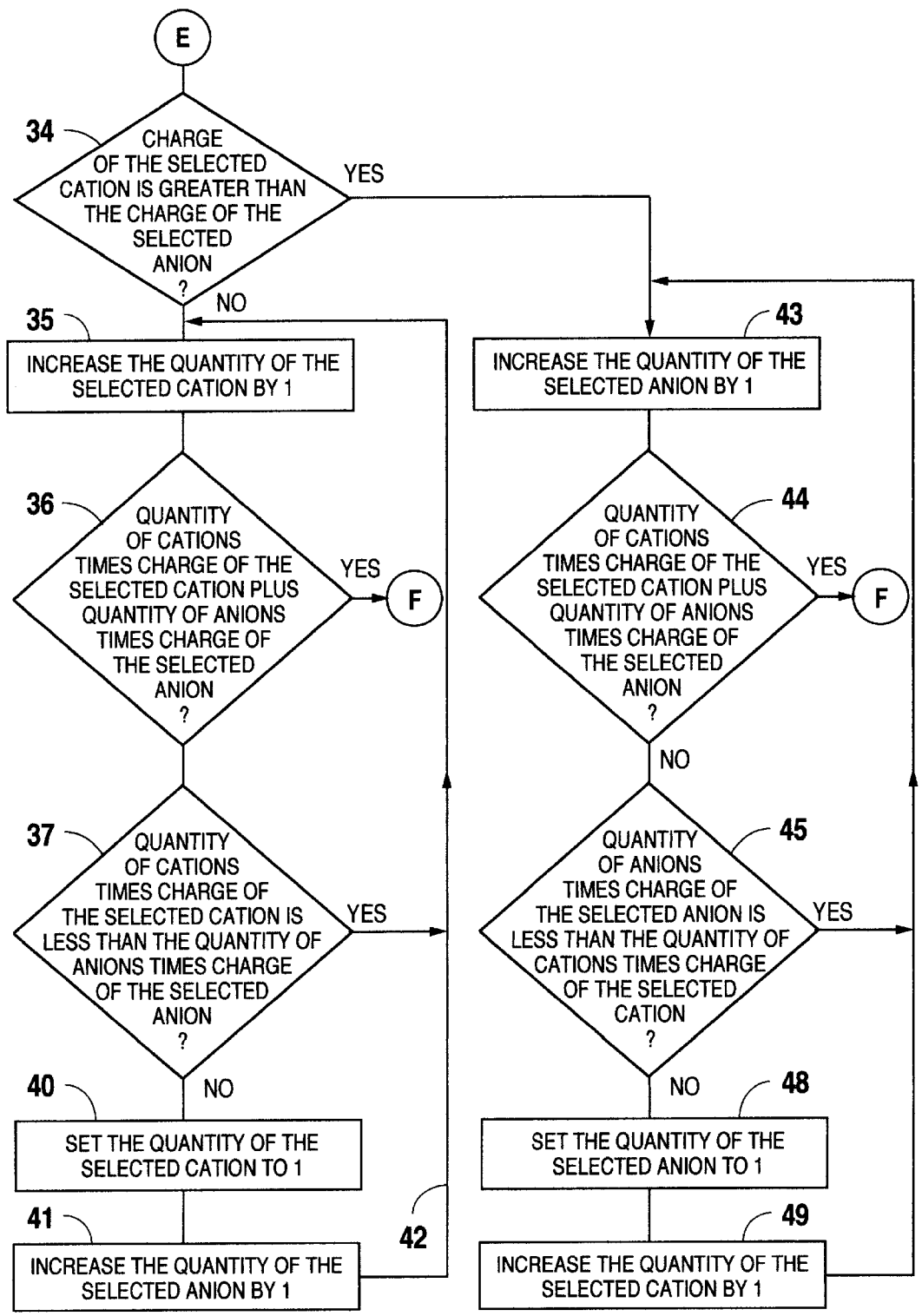

After randomly selecting an anion and cation, the answer generator 5 controls the processor to balance the charges of the cations and anions. Referring to FIGS. 6 and 7, the processor sets the quantity of the selected cation to 1 in step 25, and then sets the quantity of the selected anion to 1 in step 26. Next in step 27, the processor looks up the charge of the selected cation and the selected anion in the cation and anion tables stored in the databases 3 and 4. In step 29, the processor determines if the absolute value of the cation charge times the anion charge is greater than ten. In this preferred embodiment, the problem is considered too complex if the absolute value is greater than ten. Consequently, the processor sets the anion as used, as previously described, in step 29a and then returns to step 21. If the absolute valve is less than ten, the processor in step 30 looks up the English name for the selected cation and anion in the cation and anion tables stored in databases 3 and 4, and then, in step 31, the Spanish name for the selected cation and anion in the cation and anion tables. Next in step 32, the processor looks up the chemical symbol for the selected cation and anion in the cation and anion tables. In step 33, the processor determines if the charge of one cation plus the charge of one anion equals zero. If the combined charge is not zero, the processor proceeds to step 34 (described herein), otherwise, the processor proceeds to step 51 (described herein).

Referring to FIG. 7, the processor in step 34 determines whether the absolute value of the cation's charge is greater than the absolute value of the anion charge's. If the absolute value of the cation charge is not greater, the processor in step 35 increases the quantity (e.g. 2Cu being 2 quantity) of the selected cation by 1. The processor in step 36 determines whether the total cations times the selected cation's charge (e.g. 2Cu is 2*+1=+2) plus the total anions times the selected anion's charge (e.g. 2Br is 2*-1=-2) equals zero. If the sum of the total charges equals zero, the processor proceeds to step 51 (described herein). If the sum of the total charges does not equal zero, the processor determines whether the absolute value of the total cation charge is less than the absolute value of the total anion charge. If the total cation charge is less, the processor returns to step 35. If the total cation charge is not less, the processor in step 40 sets the quantity of the selected cation to 1 and then increases the quantity of the selected anion by 1 in step 41. Afterwards, the processor then returns to step 35. This loop is repeated until the sum of the total cation charge and the total anion charge equals zero.

If the absolute value of the cation's charge is greater than the absolute valve of the anion's charge, the processor in step 43 increases the quantity of the selected anion by 1. The processor determines whether the quantity of cations times the selected cation's charge plus quantity of anions times the selected anion's charge equals zero. If that sum equals zero, the processor proceeds to step 51 (described herein), otherwise, in step 45, the processor determines whether the absolute value of the total anion charge is less than the absolute value of the total cation charge. If the total anion charge is less, the processor returns to step 43. If the total anion charge is not less, the processor in step 48 sets the quantity of the selected anion to 1 and then, in step 49, increases the quantity of the selected cation by 1. Afterwards, the processor returns to step 43. This loop is repeated until the sum of the total cation charge and the total anion charge equals zero.

Figure 8:
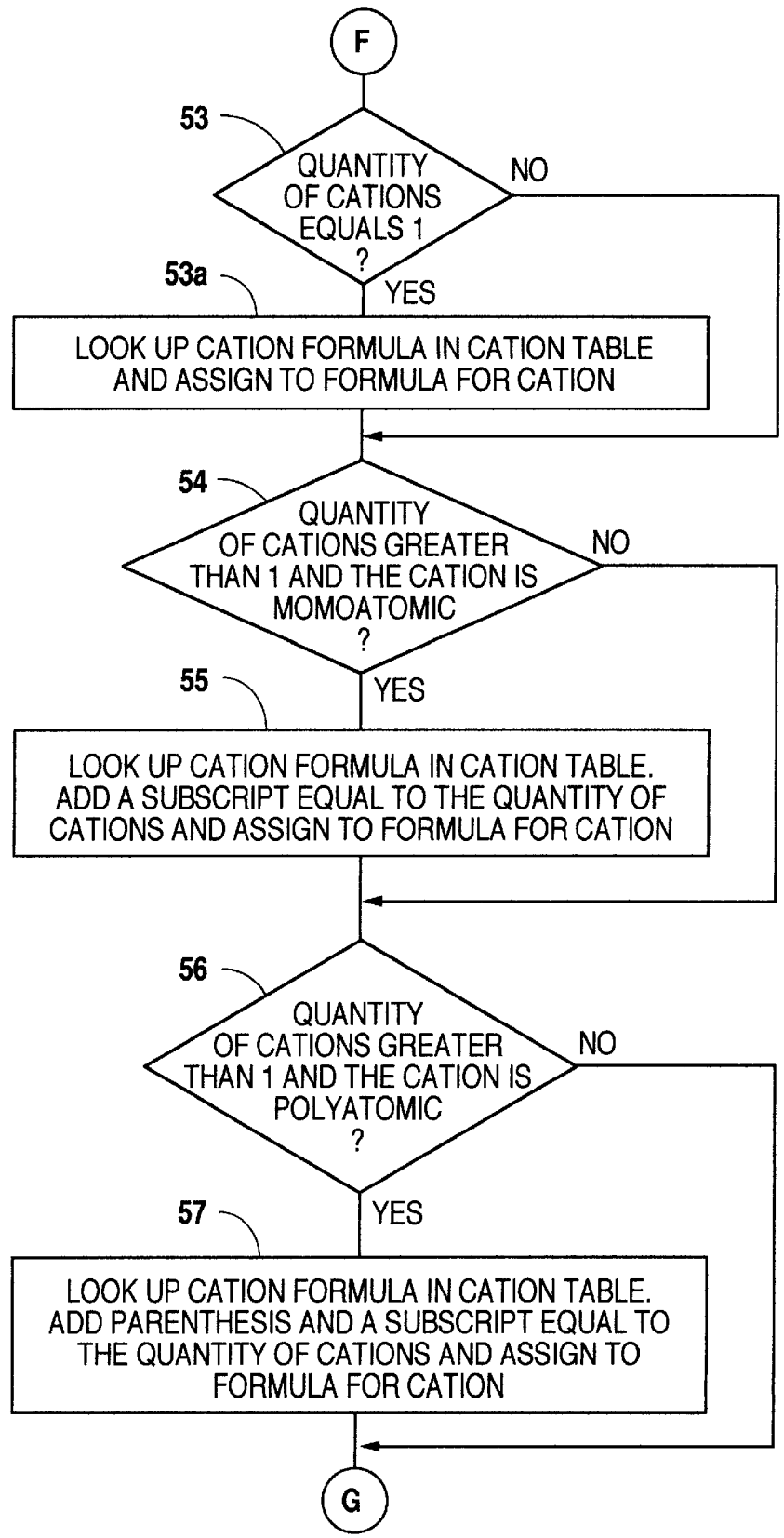

After balancing the charges of the anion and cation, the answer generator 5 controls the processor to create the subscripts for the cation and anion portions of the chemical formula. Referring to FIG. 8, the processor in step 53 begins determining the form of the subscript of the cation by determining if the quantity of cations equals one. If the quantity of cations is not equal to one, the processor proceeds directly to step 54 (described herein). If the quantity of cations is equal to one, the processor in step 53a looks up the cation formula in the cation table and assigns the formula for the cation. In step 54, the processor determines if the quantity of cations is greater than 1 and if the cation is monoatomic. If the quantity of cations is not greater than 1 or the cation is not monoatomic, the processor proceeds directly to step 56 (described herein). If the quantity of cations is greater than 1 and the cation is monoatomic, the processor in step 55 looks up the cation formula in the cation table, adds a subscript to the cation equal to the quantity of cations, and assigns the formula to the cation (e.g. 2Cu becomes Cu2). In step 56, the processor determines if the quantity of cations is greater than 1 and if the cation is polyatomic, that is more than one atom. If the number of cations is not greater than 1 or if the cation is not polyatomic, the processor proceeds directly to step 58 (described herein with reference to FIG. 9). If the number of cations is greater than 1 and the cation is polyatomic, the processor in step 57 looks up the cation formula in the cation table, adds parenthesis around the cation, places a subscript equal to the quantity of cations outside the parenthesis, and assigns the formula to the cation. Afterwards, the processor proceeds to step 58 (described herein with reference to FIG. 9).

Figure 9:
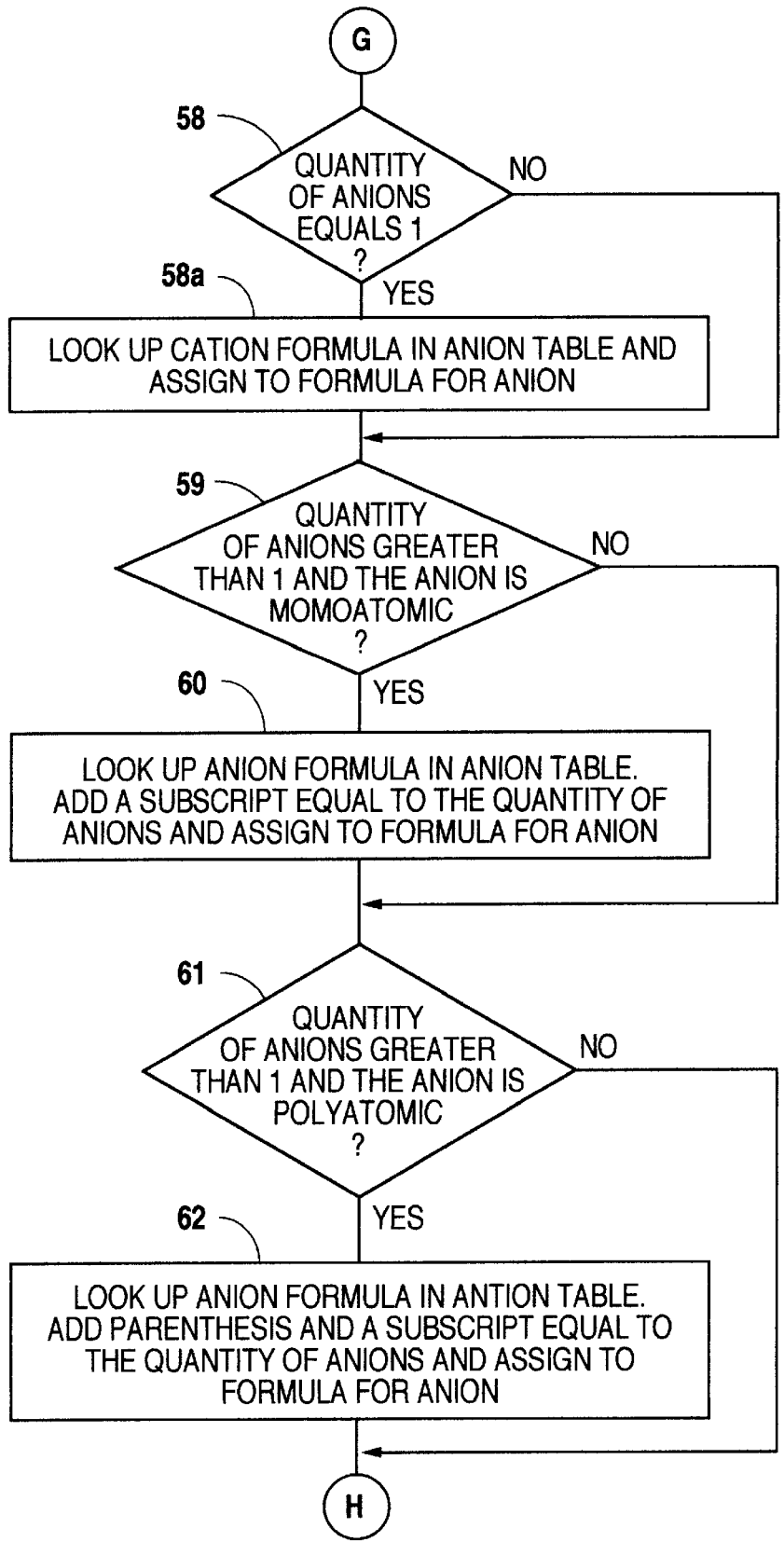

Referring to FIG. 9, the processor in step 58 begins determining the form of the subscript for the anion portion of the chemical formula by determining if the quantity of anions is equal to one. If the quantity of anions is not equal to one, the processor proceeds directly to step 59 (described herein). If the quantity of anions is equal to one, the processor in step 58a looks up the anion formula in the anion table and assigns the formula for the anion. In step 59, the processor determines if the quantity of anions is greater than 1 and if the anion is monoatomic. If the quantity of anions is not greater than 1 or the anion is not monoatomic, the processor proceeds directly to step 61 (described herein). If the quantity of anions is greater than 1 and the anion is monoatomic, the processor in step 60 looks up the anion formula in the anion table, adds a subscript to the anion equal to the number of anions, and assigns the formula to the anion. In step 61, the processor determines if the quantity of anions is greater than 1 and if the anion is polyatomic, that is more than one atom. If the quantity of anions is not greater than 1 or if the anion is not polyatomic, the processor proceeds directly to step 63 in FIG. 10 (described herein). If the number of anions is greater than 1 and the anion is polyatomic, the processor looks up the anion formula in the anion table, adds parenthesis around the anion, places a subscript equal to the quantity of anions outside the parenthesis, and assigns the formula to the anion in step 62. Afterwards, the processor proceeds to step 63.

Figure 10:
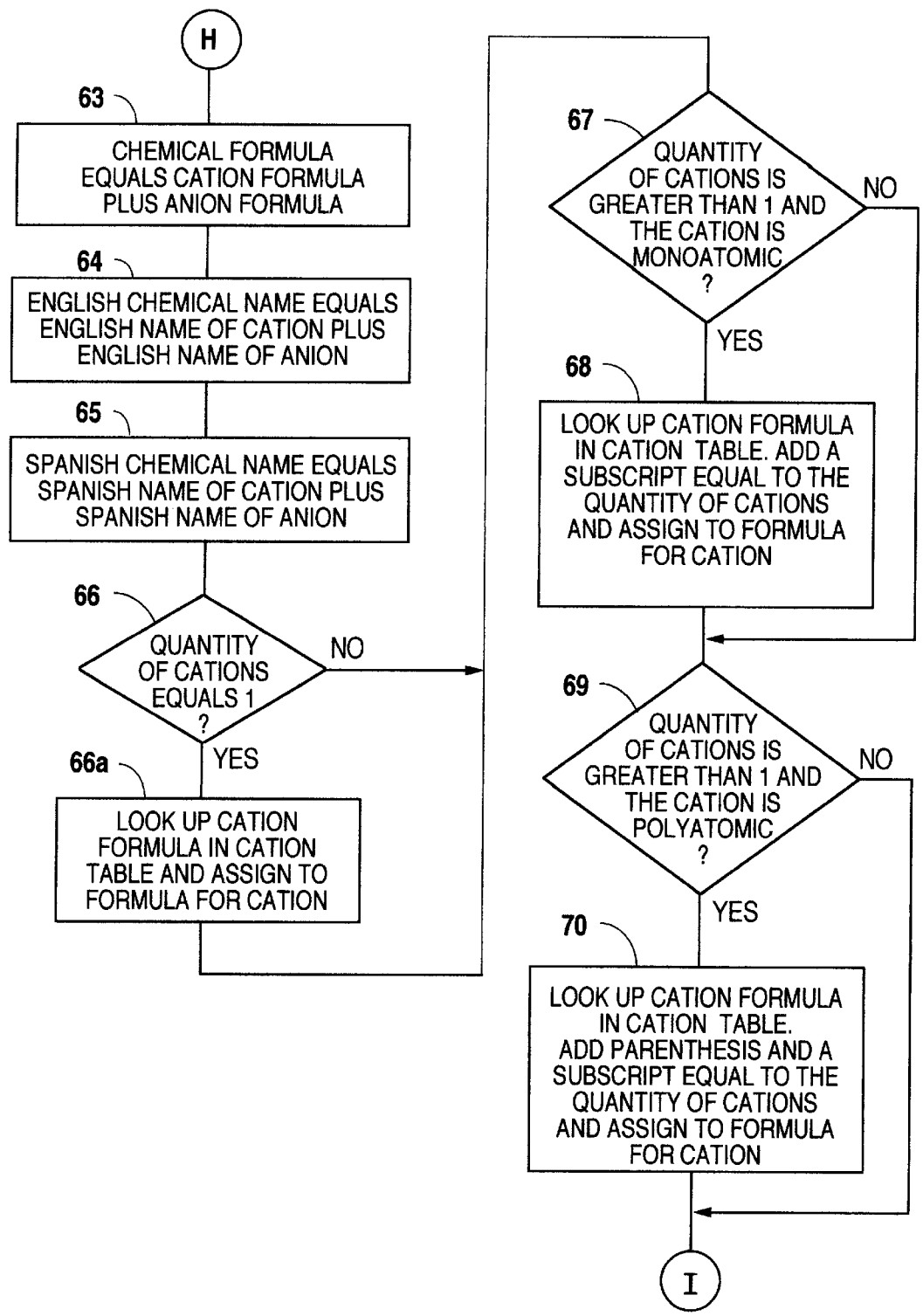

After determining the subscripts for the cation and anion portions of the chemical formula, the answer generator 5 controls the processor in step 63 to create the chemical formula, English chemical name, and Spanish chemical name of the correct answer. Referring to FIG. 10, the processor creates the chemical formula of the correct answer by adding the cation and anion formulas together. In step 64, the processor creates the English chemical name of the correct answer by retrieving the English cation name from database 3 and the English anion name from the database 4 and adding the cation and anion names together. In step 65, the processor creates the Spanish chemical name of the correct answer by retrieving the Spanish cation name from database 3 and the Spanish anion name from the database 4 and adding the cation and anion names together. Referring to FIGS. 2A–B, an example of a chemical formula for the first correct answer created by the answer generator 5 is the formula CuBr. Examples of the respective English and Spanish chemical names are copper(I) bromide and cobre(I) bromuro.

After creating the formula and names of the correct answer, the answer generator 5 controls the processor to create the first incorrect answer. To generate the first incorrect answer, the processor takes the valid cation symbol (e.g. Cu) and combines it with the invalid anion symbol (e.g. BrO3). However, the processor uses the valid cation and anion subscripts for the correct answer as previously described. The answer generator 5 controls the processor to begin creating the subscripts for the cation and anion portions of the chemical formula. The answer generator 5 controls the processor to create the cation portion by executing the steps 66, 66a, and 67–70 in FIG. 10, which are identical to the previously described steps 53, 53a, and 54–57. After determining the subscript for the cation, the processor proceeds to step 71 in FIG. 11 to calculate the subscripts for the anions.

Figure 11:
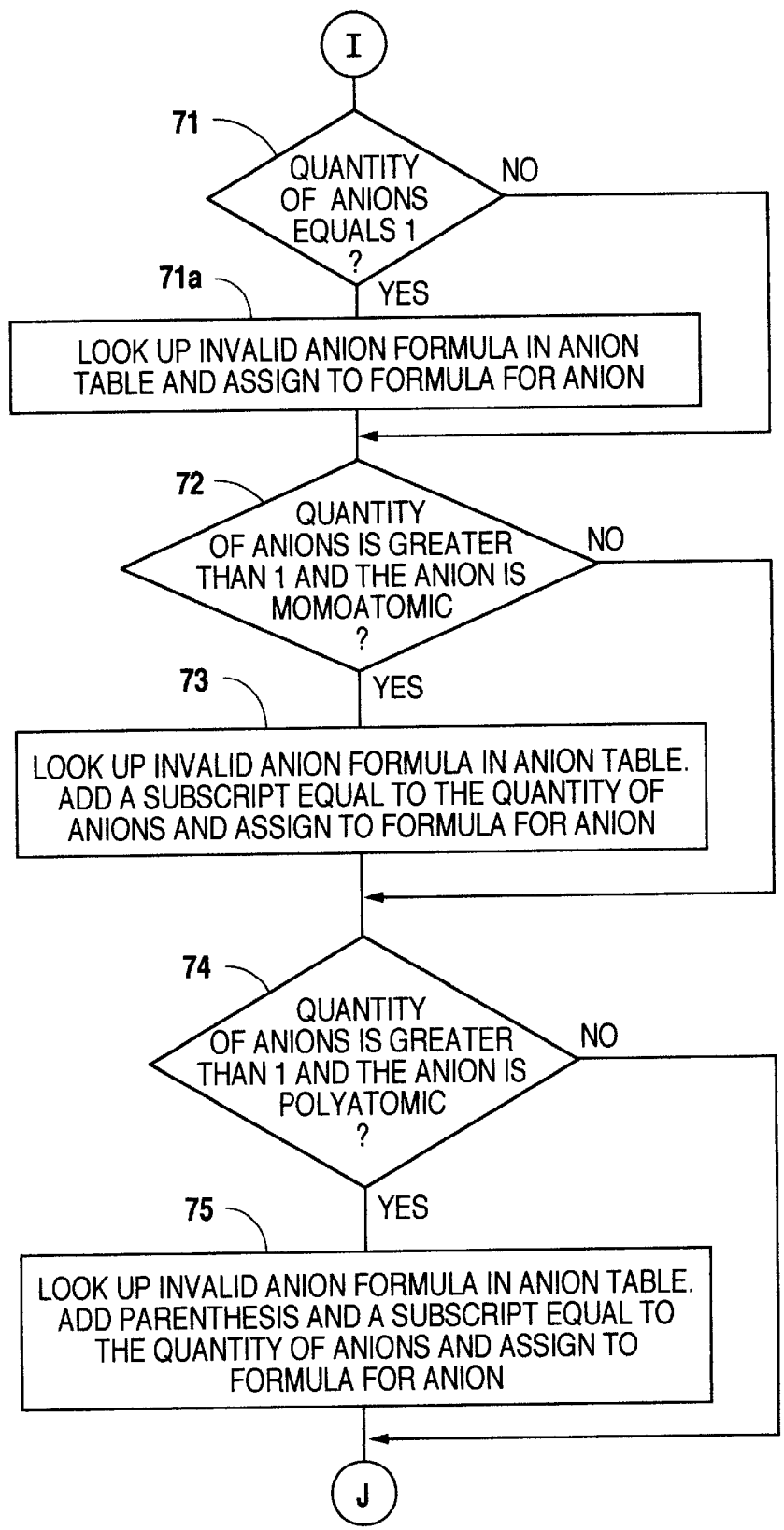

Referring to FIG. 11, the processor in step 71 begins generating the subscript of the anion for the first incorrect answer by determining whether the quantity of anions equals 1. If the quantity of anions is not equal to one, the processor proceeds directly to step 72 (described herein). If the quantity of anions is equal to one, the processor in step 71a looks up the invalid anion formula in the anion table and assigns the invalid formula for the anion. In step 72, the processor determines if the quantity of anions is greater than 1 and if the anion is monoatomic. If the quantity of anions is not greater than 1 or the anion is not monoatomic, the processor proceeds directly to step 74 (described herein with reference to FIG. 11). If the quantity of anions is greater than 1 and the anion is monoatomic, the processor in step 73 looks up the invalid anion formula in the anion table, adds a subscript to the invalid anion equal to the quantity of anions, and assigns the invalid formula to the anion. In step 74, the processor determines if the quantity of anions is greater than 1 and if the anion is polyatomic, that is more than one atom. If the quantity of anions is not greater than 1 or if the anion is not polyatomic, the processor proceeds directly to step 76 in FIG. 12 (described herein with reference to FIG. 12). If the quantity of anions is greater than 1 and the anion is polyatomic, the processor in step 75 looks up the invalid anion formula in the anion table, adds parenthesis around the invalid anion, places a subscript equal to the quantity of anions outside the parenthesis, and assigns the invalid formula to the anion. Afterwards, the processor proceeds to step 76.

Figure 12:
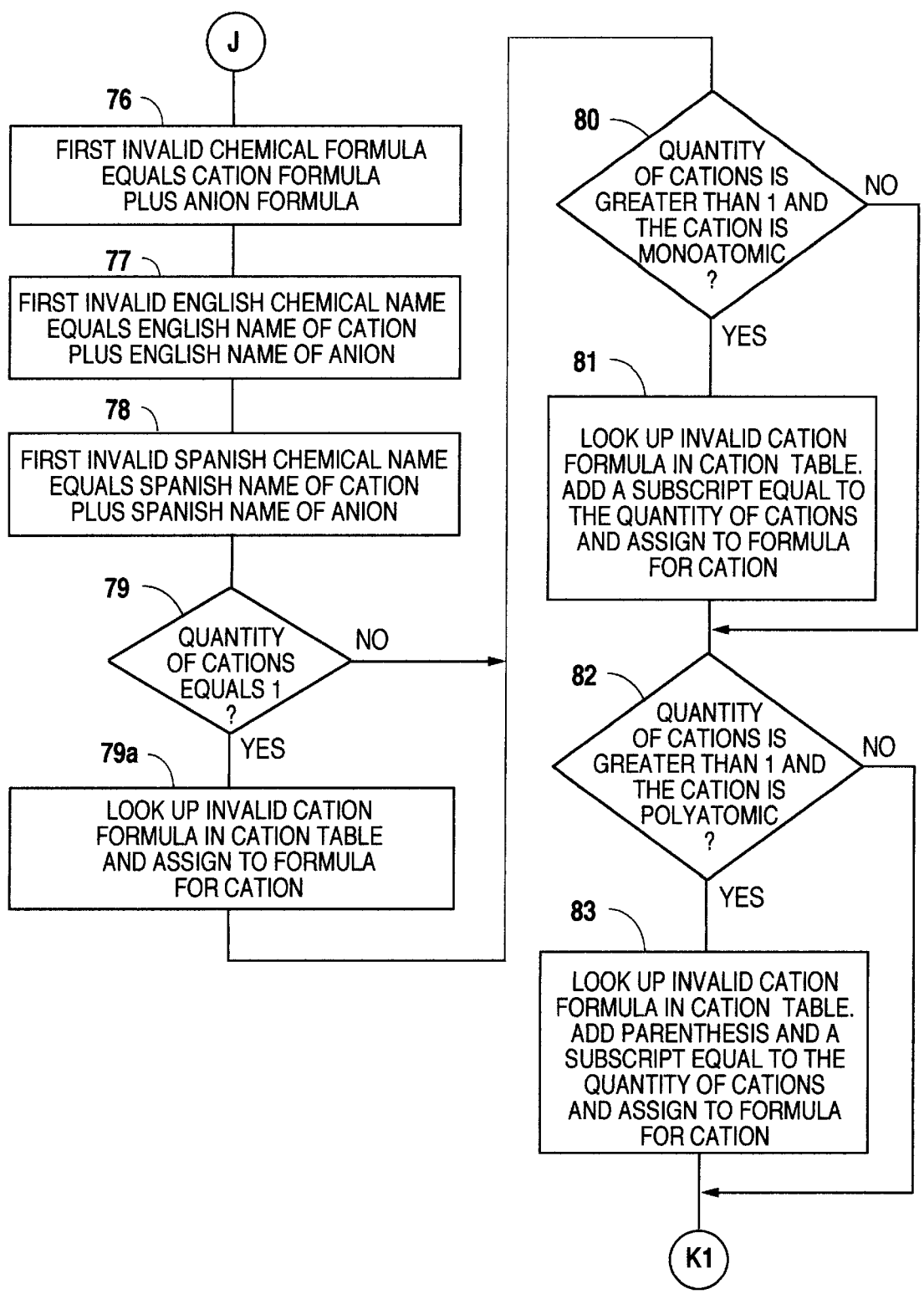

After determining the subscripts for the cation and invalid anion portions of the chemical formula, the answer generator 5 controls the processor to create the chemical formula, English chemical name, and Spanish chemical name of the first incorrect answer. Referring to FIG. 12, the processor in step 76 creates the chemical formula of the first incorrect answer by adding the cation and invalid anion formulas together. In step 77, the processor reads from the databases 3 and 4 to create the English chemical name of the first incorrect answer by adding the English name of the cation plus the English name of the invalid anion. In step 78, the processor reads from the databases 3 and 4 to create the Spanish chemical name of the first incorrect answer by adding the Spanish name of the cation plus the Spanish name of the invalid anion. Referring to FIGS. 2A–B, an example of a chemical formula for the first incorrect answer created by the processor is the formula CuBrO3. Examples of the respective English and Spanish chemical names are copper (I) bromate and cobre(I) bromato.

After creating the formula and names of the first incorrect answer, the answer generator 5 controls the processor to create the second incorrect answer. To generate the second incorrect answer, the processor takes the invalid cation symbol (e.g. Co) and combines it with the anion symbol (e.g. Br). However, the processor uses the valid cation and anion subscripts for the correct answer as previously described. The processor begins by creating the subscripts for the cation and anion portions of the chemical formula.

Referring to FIG. 12, the processor in step 79 begins generating the subscript of the cation for the second incorrect answer by determining if the quantity of cations is equal to one. If the quantity of cations is not equal to one, the processor proceeds directly to step 80 (described herein). If the quantity of cations is equal to one, the processor in step 79a looks up the invalid cation formula in the cation table and assigns the invalid formula for the cation. In step 80, the processor determines if the quantity of cations is greater than 1 and if the cation is monoatomic. If the quantity of cations is not greater than 1 or the cation is not monoatomic, the processor proceeds directly to step 82 (described herein). If the quantity of cations is greater than 1 and the cation is monoatomic, the processor in step 81 looks up the invalid cation formula in the cation table, adds a subscript to the invalid cation equal to the quantity of cations, and assigns the invalid formula to the cation. In step 82, the processor determines if the quantity of cations is greater than 1 and if the cation is polyatomic, that is more than one atom. If the quantity of cations is not greater than 1 or if the cation is not polyatomic, the processor proceeds directly to step 84 (described herein with reference to FIG. 13). If the quantity of cations is greater than 1 and the cation is polyatomic, the processor in step 83 looks up the invalid cation formula in the cation table, adds parenthesis around the invalid cation, places a subscript equal to the quantity of cations outside the parenthesis, and assigns the invalid formula to the cation. Afterwards, the processor proceeds to step 84.

Figure 13:
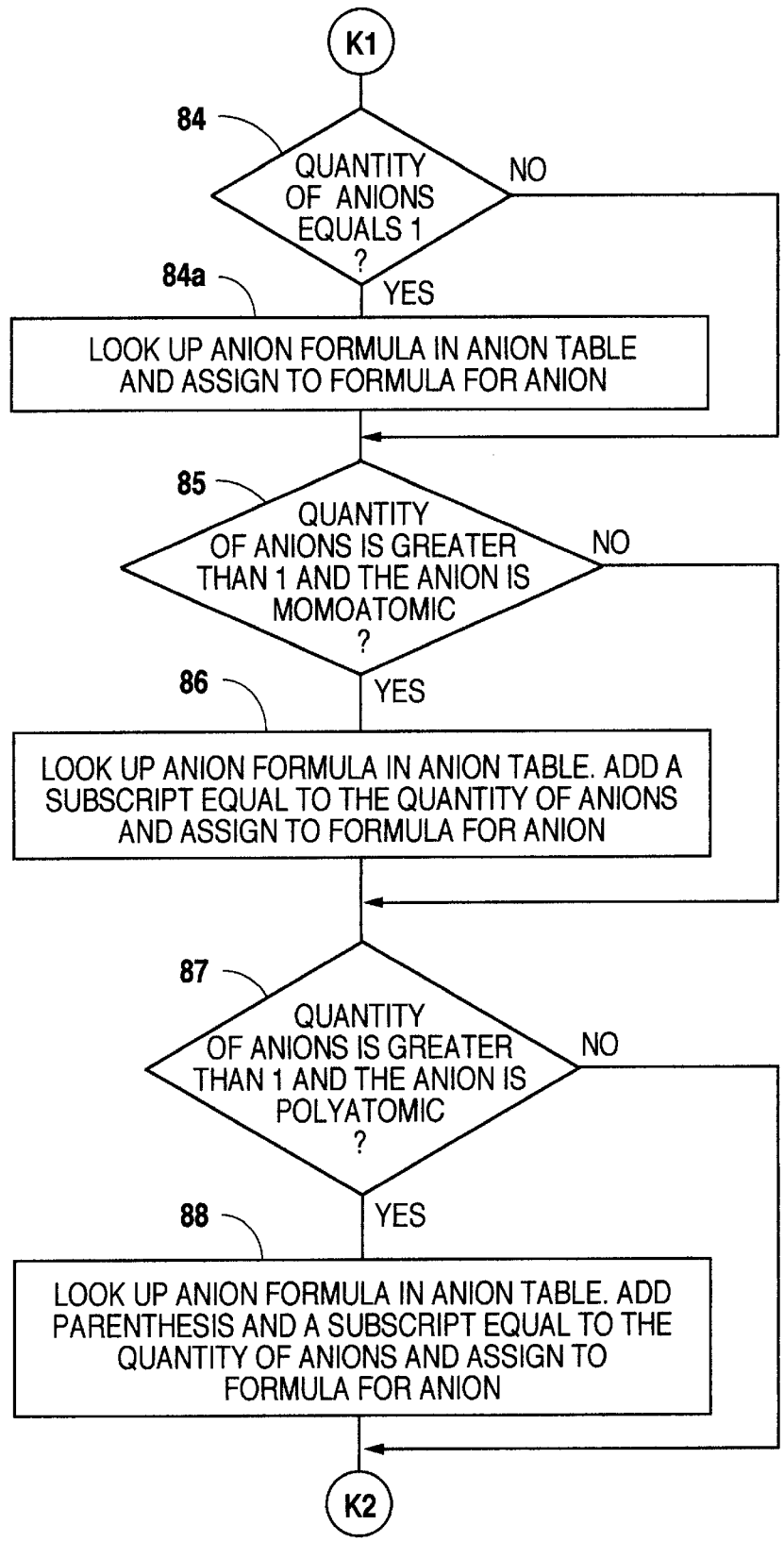

Referring to FIG. 13, the answer generator 5 controls the processor to create the anion portion of the second incorrect answer. The processor executes the steps 84, 84*a*, and 85–88, which are identical to the previously described steps 58, 58*a*, and 59–62. After determining the subscript for the anion, the processor proceeds to step 89 to generate the formula and names for the second incorrect answer.

Figure 14:
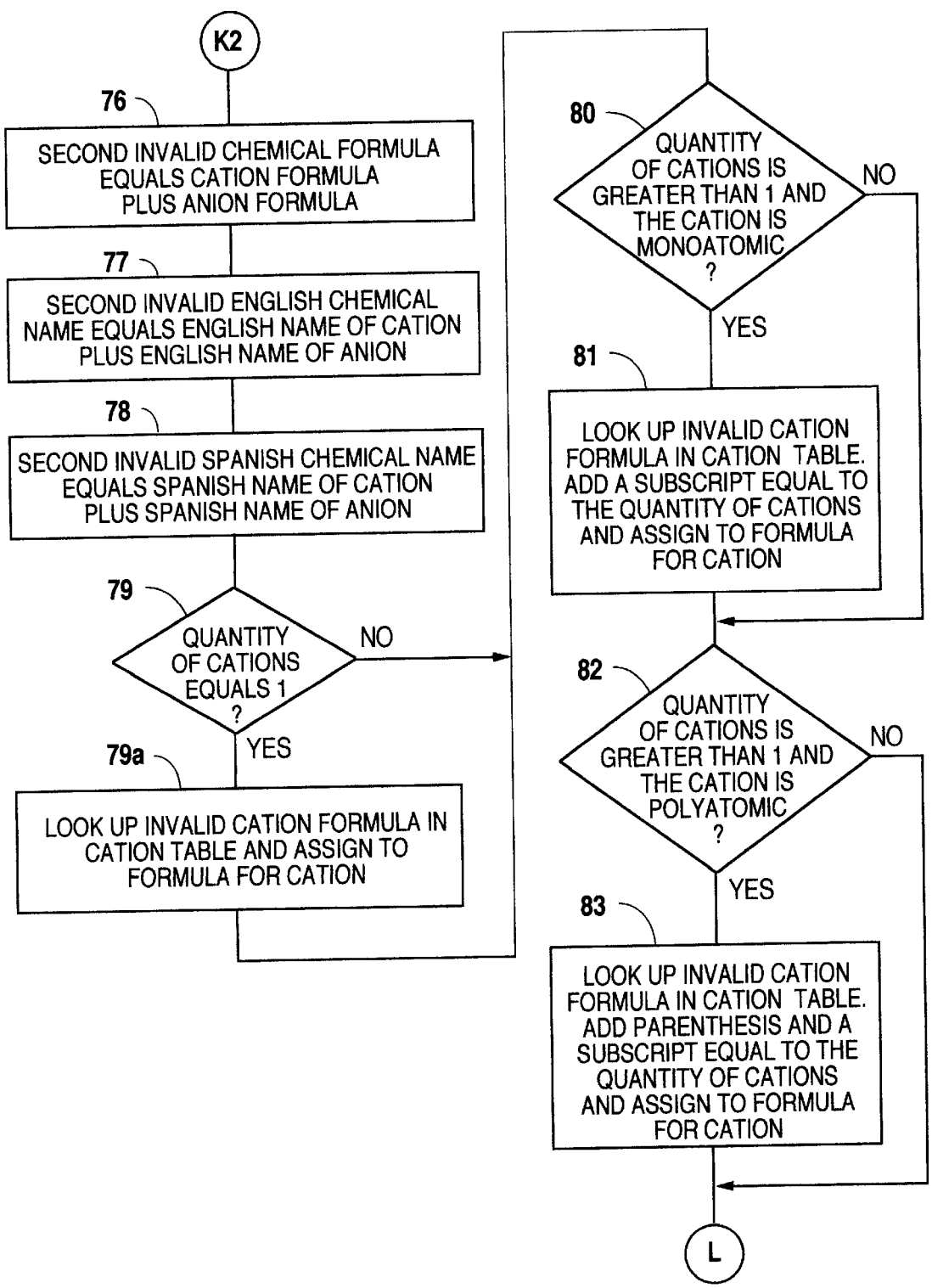

After determining the subscripts for the invalid cation and anion portions of the chemical formula, the answer generator 5 controls the processor to create the chemical formula, English chemical name, and Spanish chemical name of the second incorrect answer. Referring to FIG. 14, the processor in step 89 creates the chemical formula of the second incorrect answer by adding the invalid cation and anion formulas together. In step 90, the processor reads the databases 3 and 4 to create the English chemical name of the first incorrect answer by adding the English name of the invalid cation plus the English name of the anion. In step 91, the processor reads the databases 3 and 4 to create the Spanish chemical name of the first incorrect answer by adding the Spanish name of the invalid cation plus the Spanish name of the anion. Referring to FIGS. 2A–B, an example of a chemical formula for the second incorrect answer created by the processor is the formula CoBr. Examples of the respective English and Spanish chemical names are copper bromide and cobre bromuro.

After creating the formula and names of the second incorrect answer, the answer generator 5 controls the processor to create the third incorrect answer. To generate the third incorrect answer, the processor takes the invalid cation symbol (e.g. Co) and combines it with the invalid anion symbol (e.g. BrO3). However, the processor uses the valid cation and anion subscripts for the correct answer as previously described. The processor begins by creating the subscripts for the cation and anion portions of the chemical formula. The processor creates an invalid cation portion by executing the steps 92, 92*a*, and 93–96 in FIG. 14, which are identical to the previously described steps 79, 79*a*, and 80–83. After determining the subscript for the invalid cation, the processor proceeds to step 97 in FIG. 15 to calculate the subscript for the anion.

Figure 15:
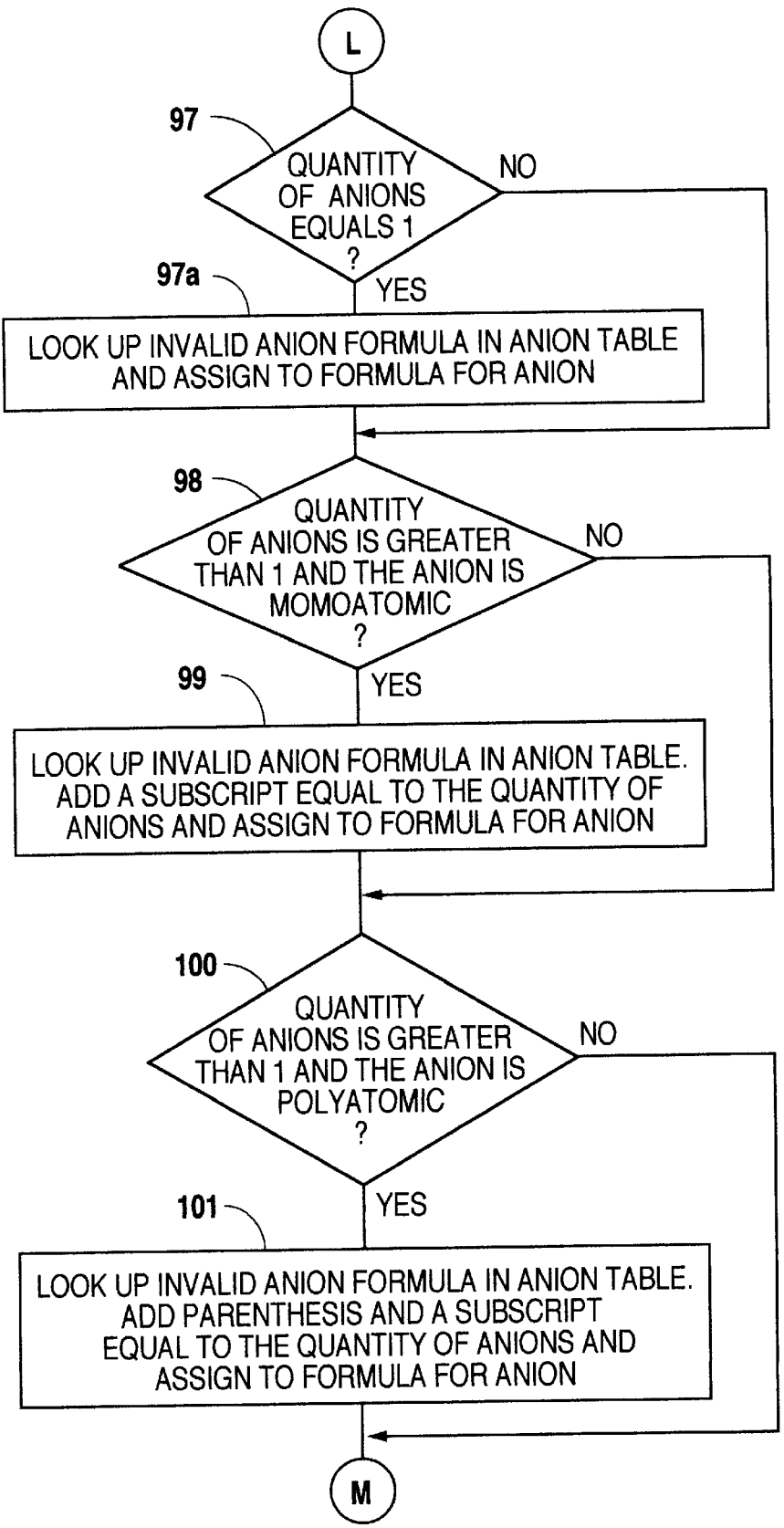

Referring to FIG. 15, the processor creates the invalid anion portion of the third incorrect answer by executing the steps 97, 97*a*, and 98–101, which are identical to the previously described steps 71, 71*a*, and 72–75. After determining the subscript for the anion, the processor proceeds to step 102 to generate the formula and names for the third incorrect answer.

Figure 16:
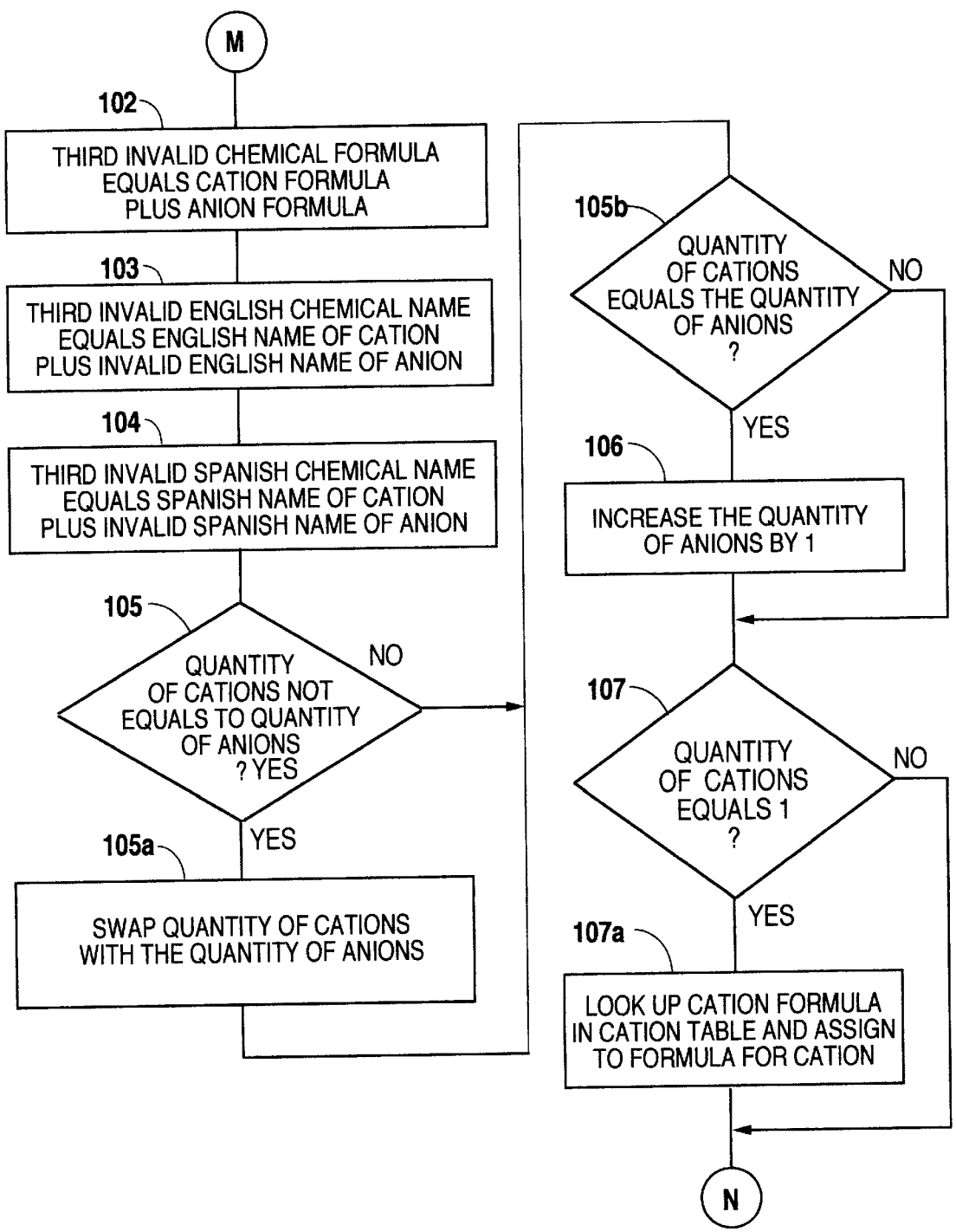

After determining the subscripts for the invalid cation and invalid anion portions of the chemical formula, the answer generator 5 creates the chemical formula, English chemical name, and Spanish chemical name of the third incorrect answer. Referring to FIG. 16, the processor in step 102 creates the chemical formula of the third incorrect answer by adding the invalid cation and invalid anion formulas together. In step 103, the processor reads the databases 3 and 4 to create the English chemical name of the third incorrect answer by adding the English name of the invalid cation plus the English name of the invalid anion. In step 104, the processor reads the databases 3 and 4 to create the Spanish chemical name of the third incorrect answer by adding the Spanish name of the invalid cation plus the Spanish name of the invalid anion. Referring to FIGS. 2A–B, an example of a chemical formula for the third incorrect answer created by the answer generator 5 is the formula CoBrO3. Examples of the English and Spanish chemical names are copper bromate and cobre bromato.

After creating the formula and names of the third incorrect answer, the answer generator 5 controls the processor to create the fourth incorrect answer. The processor creates the subscripts for the fourth incorrect answer by first retrieving the correct quantities of cations and anions from memory, then altering the quantity of anions and/or cations, and finally generating subscripts from the altered quantities of ions. Referring to FIG. 16, the processor in step 105 determines whether the quantity of cations that were used for the correct answer is not equal to the quantity of anions that were also used for the correct answer. If the quantity of cations is equal to the quantity of anions, the processor proceeds directly to step 105*b* (described herein). If the quantity of cations is not equal to the quantity of anions, the processor in step 105*a* swaps the quantity of cations and the quantity of anions. In step 105*b*, the processor determines whether the quantity of cations equals the quantity of anions. If the quantity of cations is not equal to the quantity of anions, the processor proceeds directly to step 107 (described herein). If the quantity of cations is equal to the quantity of anions, the processor increases the quantity of anions by 1 in step 106.

After altering the quantity of anions, and possibly the quantity of cations, the answer generator 5 controls the processor to create the subscripts for the cation and anion portions of the chemical formula for the fourth incorrect formula. The processor creates the cation portion by executing the steps 107, 107*a*, and 108–111 in FIGS. 16 and 17, which are identical to the previously described steps 53, 53*a*, and 54–57. After determining the subscript for the cation, the processor proceeds to step 112 in FIG. 17 to calculate the subscript for the anions.

Figure 17:
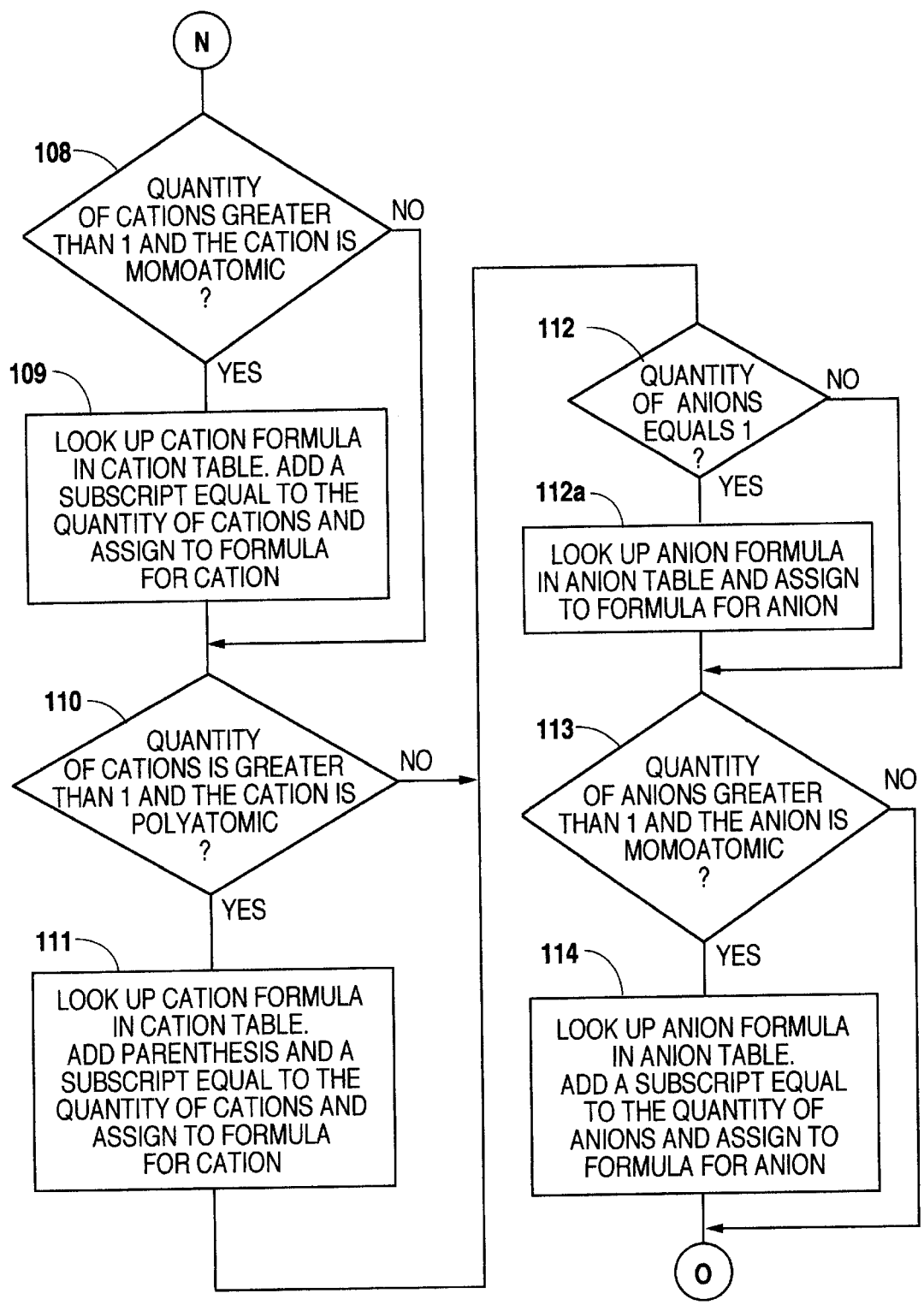
Figure 18:
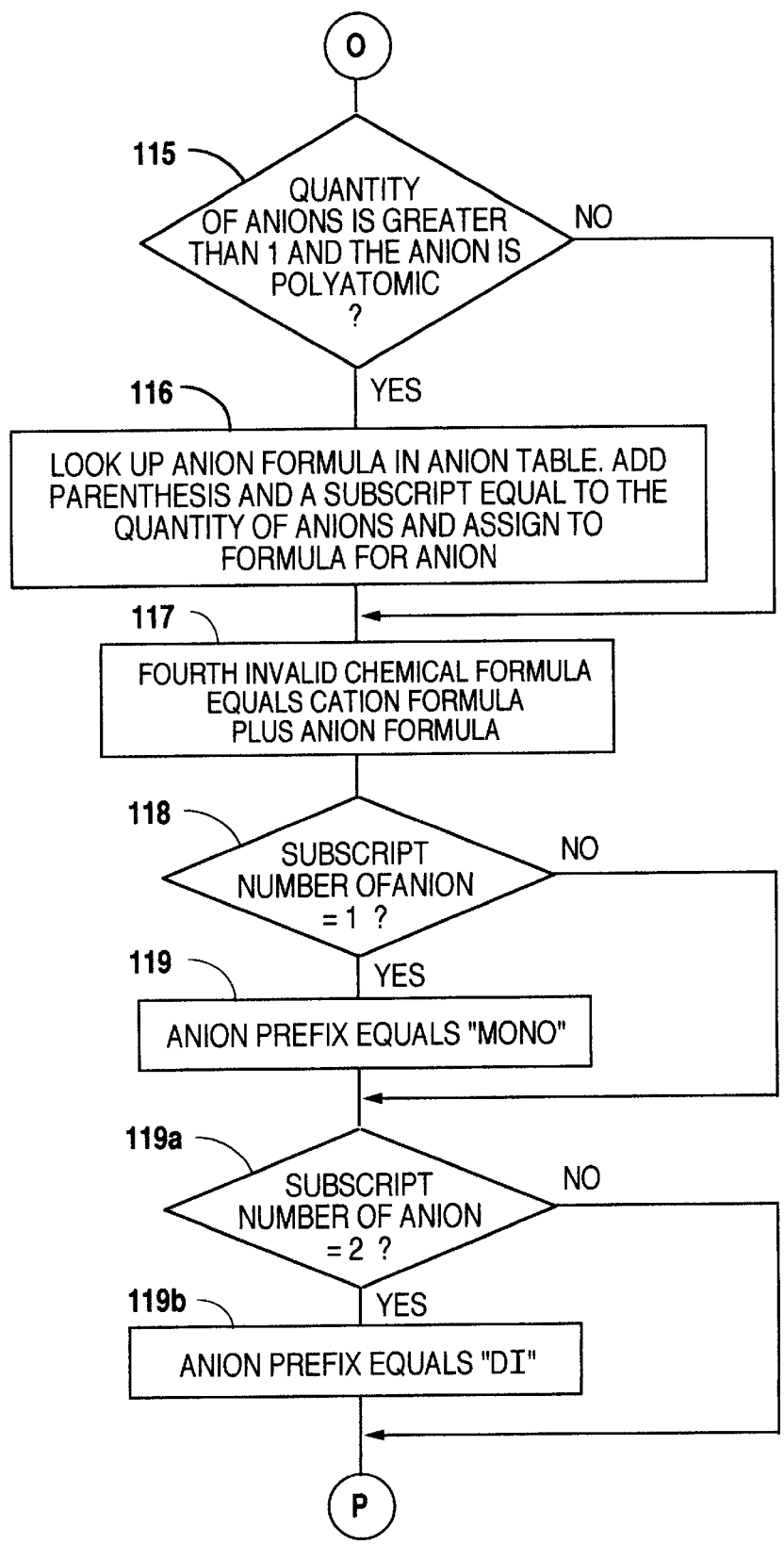
Figure 19:
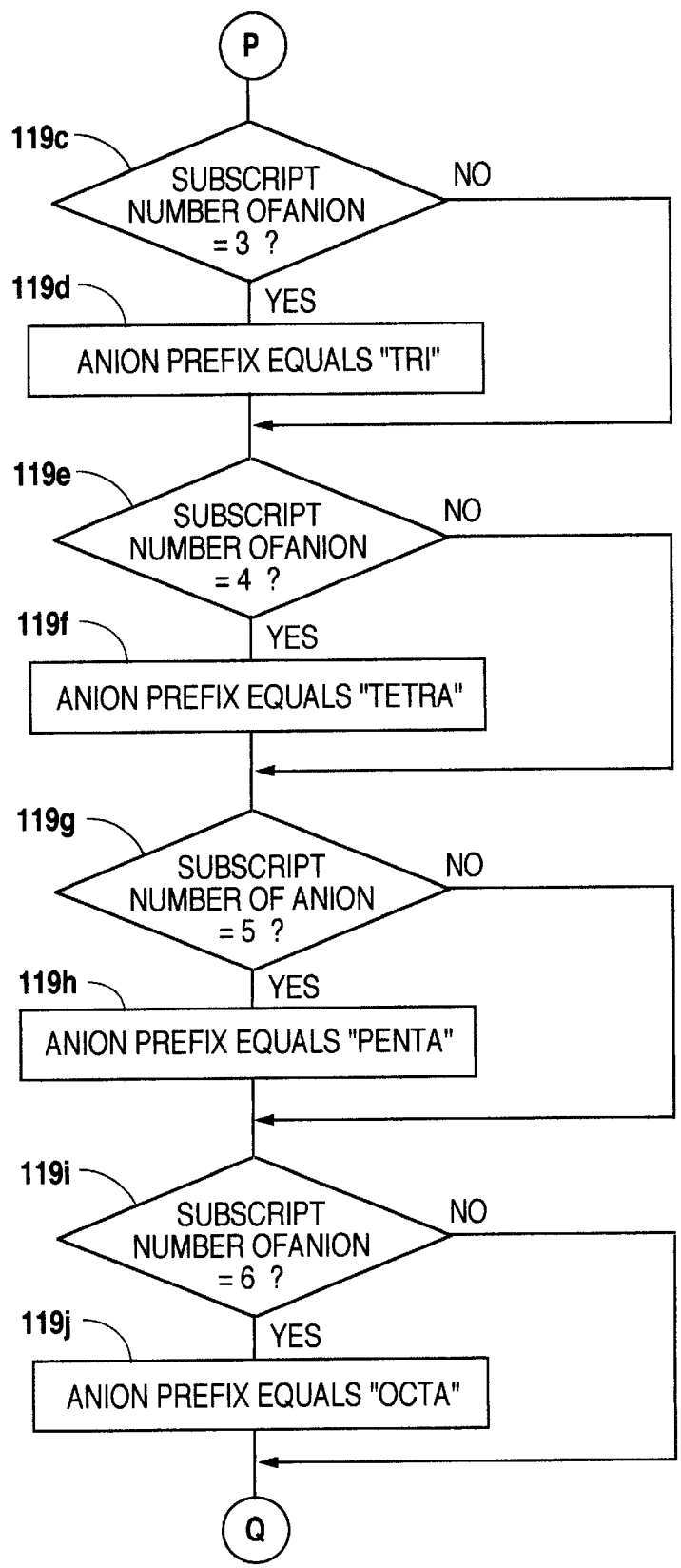
Figure 20:
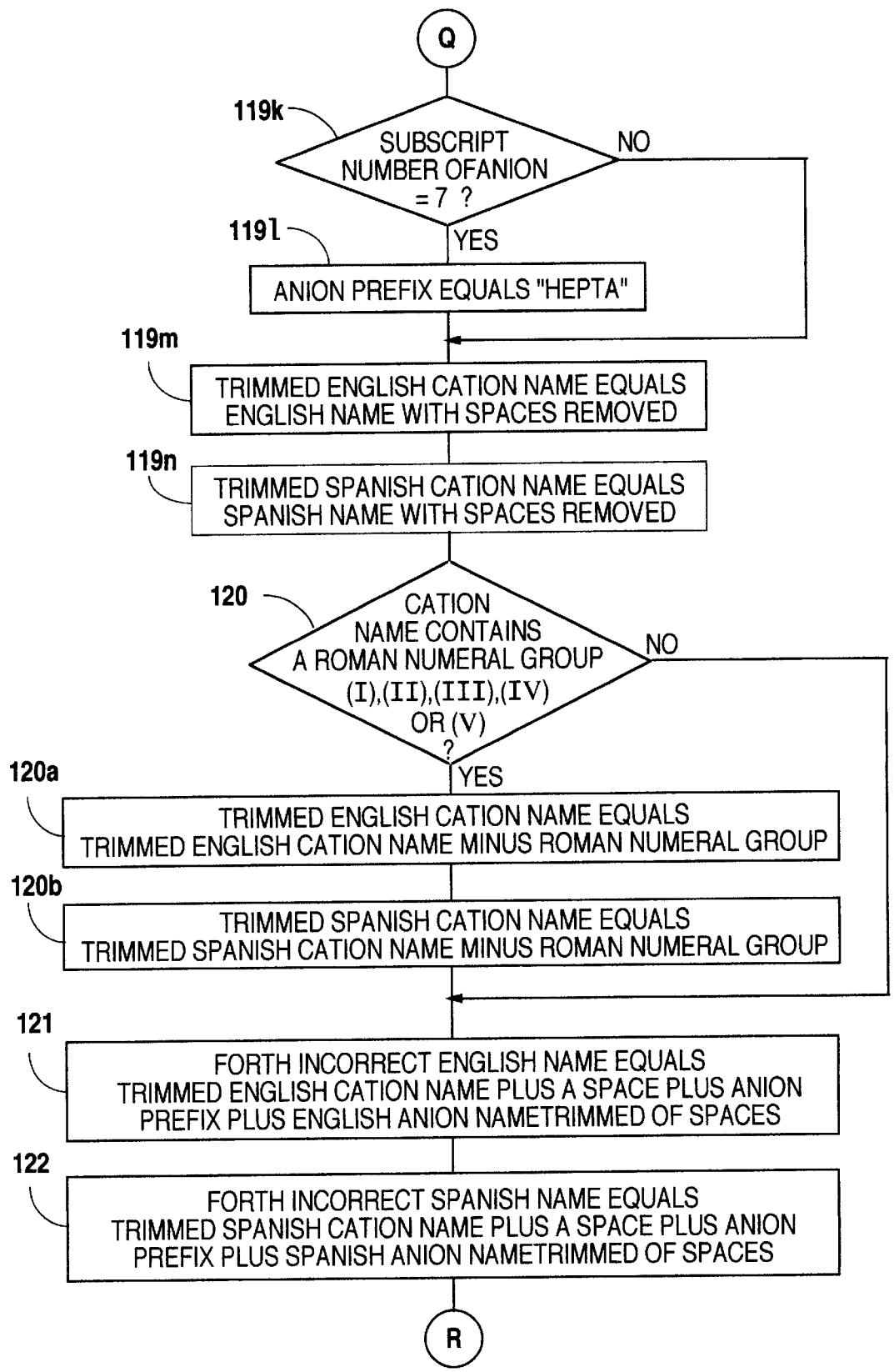

Referring to FIGS. 17–18, the answer generator 5 controls the processor to create the anion portion of the fourth incorrect answer by executing the steps 112, 112*a*, 113–116, which are identical to the previously described steps 58, 58*a*, and 59–62. After determining the subscript for the anion, the processor proceeds to step 117 to generate the formula and names for the fourth incorrect answer.

After determining the subscripts for the invalid cation and anion portions of the chemical formula, the answer generator 5 controls the processor to create the chemical formula, English chemical name, and Spanish chemical name of the fourth incorrect answer. Referring to FIG. 18, the processor in step 117 creates the chemical formula of the fourth incorrect answer by adding the cation and anion formulas together.

Although the formula is incorrect, the name of the fourth correct answer is still the correct name. Therefore, the name must be altered. Referring to FIGS. 18–21, the names of the fourth incorrect answer are created by modifying the correct names in three stages. The first stage adds a prefix to the anion portion of the name based upon the quantity of anions to the anion portion of the name. The processor in step 118 determines if the number of anions equals 1. If the number of anions does not equal 1, the processor proceeds directly to step 119*a* (described herein). If the number of anions equals 1, the processor in step 119 equates the anion prefix to "mono", and then proceeds to step 119*a*.

The processor in step 119*a* determines if the number of anions equals 2. If the number of anions does not equal 2, the processor proceeds directly to step 119*c* (described herein). If the number of anions equals 2, the processor in step 119*b* equates the anion prefix to "di", and then proceeds to step 119*c*.

The processor in step 119*c* determines if the number of anions equals 3. If the number of anions does not equal 3, the processor proceeds directly to step 119*e* (described herein). If the number of anions equals 3, the processor in step 119*d* equates the anion prefix to "tri", and then proceeds to step 119*e*.

The processor in step 119*e* determines if the number of anions equals 4. If the number of anions does not equal 4, the processor proceeds directly to step 119*g* (described herein). If the number of anions equals 4, the processor in step 119*f* equates the anion prefix to "tetra", and then proceeds to step 119*g*.

The processor in step 119*g* determines if the number of anions equals 5. If the number of anions does not equal 5, the processor proceeds directly to step 119*i* (described herein). If the number of anions equals 5, the processor in step 119*h* equates the anion prefix to "penta", and then proceeds to step 119*i*.

The processor in step 119*i* determines if the number of anions equals 6. If the number of anions does not equal 6, the processor proceeds directly to step 119*k* (described herein). If the number of anions equals 6, the processor in step 119*j* equates the anion prefix to "octa", and then proceeds to step 119*k*.

The processor in step 119*k* determines if the number of anions equals 7. If the number of anions does not equal 7, the processor proceeds directly to step 119*m* (described herein). If the number of anions equals 7, the processor in step 119*l* equates the anion prefix to "hepta", and then proceeds to step 119*m*.

After assigning a prefix to the anion, the processor in step 119*n* equates the trimmed English cation name with the English name with the spaces removed in step 119*m* (e.g. copper(I) bromide modified to copper bromide) and then equates the trimmed Spanish cation name with the Spanish name with the spaces removed.

The second of modification removes any Roman numeral designation from the cation. The processor in step 120 determines whether the cation name contains a Roman number group (I), (II), (III), (IV), or (V). If the cation name does not contain a Roman number group, the processor proceeds directly to step 121 (described herein). If the cation contains a Roman number group, the processor in step 120*a* equates the trimmed English cation name with the trimmed English cation name minus the Roman number group, and then, in step 120*b*, equates the trimmed Spanish cation name with the trimmed Spanish cation name minus the Roman number group. The processor in step 121 equates the fourth incorrect English name with the trimmed English cation name plus a space plus anion prefix plus English anion name trimmed of spaces and then, in step 122, equates the fourth incorrect Spanish name with the trimmed Spanish cation name plus a space plus anion prefix plus Spanish anion name trimmed of spaces.

A third stage of modification alters the suffix of the chemical name. Referring to FIG. 21, the processor determines whether the fourth incorrect English name ends in "ide". If the incorrect name does not end in "ide", the processor proceeds directly to step 126 (described herein). If the name ends in "ide", the processor in step 124 replaces "ide" with "ite" in the English name and then, in step 125, replaces "uro" with "ito" in the Spanish name. In step 126, the processor determines whether the fourth incorrect English name ends in "ate" or "ite". If the fourth incorrect English name does not end in "ate" or "ite", the processor proceeds directly to step 129 (described herein). If the fourth incorrect English name ends in "ate" or "ite", the processor replaces "ate" or "ite" with "ide" in the fourth incorrect English name and then replaces "ato" or "ito" with "uro" in the fourth incorrect Spanish name. Afterwards, the processor organizes the correct answer and four incorrect answers for generating test questions by the processor controlled by the test generator question 6.

The test generator 6 controls the processor to create test questions for students. The question can give the symbol and ask the student to select the correct name from among the incorrect names or give the correct name and ask the student to select the correct symbol from among the incorrect symbols.

Referring to FIG. 22, the test question generator 6 has the processor in step 130 determine whether the chemical name is to be unknown. If the chemical name is to be known, the processor proceeds to step 140 (described herein). If the chemical name is to be unknown, the processor proceeds to step 131. In both types of questions, one preferred embodiment creates test answers A–E by utilizing three tables. The first table sequentially assigns the numbers 1 through 5 to the correct answer, first incorrect answer, etc. (e.g. correct answer is 1, first incorrect answer is 2, . . . until fourth incorrect answer is 5). The second table, the random mix table, holds randomly selected numbers corresponding to the answers in the first table. The third table assigns letters to the random numbers as they are generated.

To begin the generation of test answers, the processor, in step 131, clears the random mix table and then, in step 132, chooses a random number in the range of 1 to 5. In step 133, the processor looks at the random mix table to see if the specific value is null. The random mix table has five sequentially ordered slots. Generated numbers are placed in an appropriate slot based upon their value (e.g. a randomly selected number 3 is placed in the third slot and, if a number 1 is selected next, it is placed in the first slot). If a slot has already been filled with a number, the specific value of the slot is not null. Therefore, the processor returns to step 132. If the specific value is null, the processor in step 135 assigns the randomly chosen English chemical name to the next English question answer. That is, the processor assigns letter answers A–E sequentially as numbers are generated (e.g. if the number 3 is selected first, it is assigned the letter A and, if the number 1 is selected next, it is assigned the letter B). Next, the processor in step 136 sets the specific value in the random mix table to "used". In step 137, the processor determines whether this is the correct English chemical name. If this is not the correct English chemical name, the processor proceeds directly to step 139 (described herein). If this is the correct English chemical name, the processor in step 138 assigns the appropriate letter A–E to the correct answer for generating a correct answer table (e.g. in the above examples, the correct answer is "B" corresponding to the number 1). These correct answers are organized into a table for grading tests. In step 139, the processor assigns the randomly chosen Spanish chemical name to the next Spanish question answer. Next, the processor determines whether the steps 135 through 139 have looped 5 times in step 139*a*. If the steps have not looped 5 times, the processor returns to step 135. If the steps have looped 5 times, the processor exits the random problem generator 1 to permit the printing of the generated test and test answers.

If the chemical name is to be known, the processor in step 140 clears the random mix table and then, in step 141, chooses a random number in the range of 1 to 5. In step 142, the processor looks at the random mix table to see if the specific value is null. The random mix table has five sequentially ordered slots. Generated numbers are placed in an appropriate slot based upon their value (e.g. a randomly selected number 3 is placed in the third slot and, if a number 1 is selected next, it is placed in the first slot). If a slot has already been filled with a number, the specific value of the slot is not null. Therefore, the processor returns to step 141. If the specific value is null, the processor in step 144 sets the specific value in the random mix table to "used". In step 145, the processor assigns the randomly chosen English chemical formula to the next English question answer. That is, the processor assigns letter answers A–E sequentially as numbers are generated (e.g. if the number 3 is selected first, it is assigned the letter A and, if the number 1 is selected next, it is assigned the letter B). In step 146, the processor determines whether this is the correct English chemical formula. If this is not the correct English chemical formula, the processor proceeds directly to step 147 (described herein). If this is the correct English chemical formula, the processor in step 147 assigns the appropriate letter A–E to the correct answer (e.g. in the above examples, the correct answer is "B" corresponding to the number 1). These correct answers are organized into a table for grading tests. In step 148, the processor assigns the randomly chosen Spanish chemical formula to the next Spanish question answer. Next, the processor determines whether the steps 144 through 148 have looped 5 times in step 149. If the steps have not looped 5 times, the processor returns to step 144. If the steps have looped 5 times, the processor exits the random problem generator 1 to permit the printing of the generated test and test answers.

Referring to FIGS. 23–27, a random problem generator 1 creates physics test questions. The physics test generator 1 tests the student's ability to calculate data for a projectile fired from a cannon on a cliff. The students are given the projectile's initial launch conditions to perform the calculations. All units are given in the metric system, though other measurement systems, such as the English system, may also be used.

The random problem generator 1 begins in step 200 with the processor querying the user whether a test or tutorial session is desired. The user inputs their selection which is held in the computer memory. Next, the processor in step 201 randomly chooses a launch angle of the cannon from the lower limit of 20 degrees through the upper limit of 50 degrees. In step 202, the processor randomly selects an initial velocity of the projectile from the lower limit of 25 meters per second through an upper limit of 50 meters per second. Afterwards, the processor in step 203 randomly selects a vertical height of the cliff from the lower limit of 50 meters through an upper limit of 175 meters. The initial conditions are chosen using well known randomization techniques involving a randomizing function.

After randomly choosing these launch conditions, the computer stores them in its memory for use in calculating projectile data, such as velocities, distances, and flight time. Although the formulas used to calculate the projectile data have not been described, those physics formulas are well-known and maybe found in any physics textbook.

The processor in step 204 calculates the projectile's initial vertical velocity, and then, in step 205, the initial horizontal velocity. Next, the processor in step 206 calculates the final vertical velocity, and then, in step 207, the final horizontal velocity. The processor in step 208 calculates the flight time, and then, in step 209, the horizontal distance traveled by the projectile. Finally, the processor in step 210 calculates the magnitude of the projectile's final velocity along the flight path and then, in step 211, the projectile's approach angle.

After calculating the projectile, the processor in step 212 determines if a test is desired from the query of step 200. If a test is not desired, the processor proceeds to step 218 (described herein). If a test is desired, the processor in step 213 prints test questions associated with each calculation. These test questions provide information and then ask the student to calculate various data concerning the projectile's travel. Some of the given information has been generated randomly, while the other part of the given information has been calculated from the randomly generated numbers. The given calculated numbers shown in the below examples are merely exemplary, and actual given calculated numbers in the preferred embodiment may differ. Preferably, these test questions are in the following format:

1. "A cannonball is fired with a velocity of 40 meters per second at an upward angle of 30 degrees from horizontal off the top of a cliff 100 meters high. What is the vertical component of the initial velocity?"
2. "A cannonball is fired with a velocity of 40 meters per second at an upward angle of 30 degrees from horizontal off the top of a cliff 100 meters high. What is the horizontal component of the initial velocity?"
3. "A cannonball is fired with a vertical velocity of 30 meters per second upward from the top of a cliff 100 meters high. What is the vertical component of the final velocity?"
4. "A cannonball is fired with a vertical velocity of 30 meters per second from the top of a cliff. Its vertical component of the final velocity is 150 meters per second. What is the time of flight?
5. "A cannonball is fired with a horizontal velocity of 35 meters per second outward from the top of a cliff. The time of flight was 3 seconds. How far out horizontally from the base of the cliff does the projectile strike the ground?"
6. "A cannonball is fired with a horizontal velocity of 35 meters per second. The final vertical velocity was 200 meters per second. What is the magnitude of the final velocity along the flight path just before the projectile strikes the ground?"
7. "A cannonball is fired with a horizontal velocity of 35 meters per second. The final vertical velocity was 200 meters per second? What was the approach angle to the ground?"

After printing the test questions for each calculation in step 213, the processor in step 214 prints the test questions with solved formulas and answers associated with each calculation. In step 215, the processor queries the user if another test question is desired. The processor in step 216 determines whether the user has inputted yes or no. If yes, the processor returns to step 201. If no, the processor in step 217 exits the random problem generator 1.

If the processor in step 212 determines that a test is not desired, the processor in step 218 displays on a display screen a statement giving the initial variables. After displaying the initial variables, the processor in step 219 sets an animation timer to zero. In step 220, the processor displays the animation background on the display based on the initial values that were randomly generated. The random problem generator 1 produces the animation of the background and projectile using well-known display animation techniques. Once the background has been displayed, the processor proceeds to step 221 and increments the animation timer by 0.01 seconds.

In step 222, The processor determines whether the animation timer equals the time of flight calculated in step 208. If the animation timer equals the calculated time of flight, the processor in step 223 displays the projectile on the ground at the appropriate point from the cliff. If the animation timer does not equal the calculated time of flight, the processor proceeds to step 224 and calculates the vertical position based on the animation timer value. The processor in step 225 calculates the projectile's horizontal position based on the animation timer value. Next, the processor in step 226 calculates the projectile's vertical velocity based on the animation timer value and then, in step 227, calculates the projectile's horizontal velocity based on the animation timer value. In step 228, the processor displays the projectile relative to the background using the calculated position and velocity, and then returns to step 221.

After the processor displays the projectile on the ground, the random problem generator 1 permits a student to work the problem displayed by the animation. The processor proceeds to step 229 and determines if an incorrect answer has previously been given. If the student is working the first problem and therefore has not given a wrong answer, the processor proceeds to step 231 and displays the questions without formulas and answers to the student using the format previously described. Each question is listed with a number next to it, and the student selects a specific question to solve by inputting the number placed next to that question. The processor in step 232 queries the user to input the number of the question that is desired to be worked. Illustratively, if the student wishes to solve the third problem which is the problem asking for the vertical component of the final velocity, the student enters the number 3. In step 232A, the processor determines which problem was requested and then proceeds to the appropriate step. Thus in the same illustration, the processor proceeds to step 241 because the user inputted the number 3.

For disclosure purposes, if the student selects the first problem and enters the number 1, the processor proceeds to step 233. In step 233, the processor displays the question asking for the vertical component of the initial velocity. The processor in step 234 compares the user inputted answer with the correct answer calculated in step 204. In step 235, the processor determines whether the inputted answer equals the correct answer. If the student supplies an incorrect answer, the processor in step 236 displays the solved formula and correct answer on the display, and then returns to step 201 to create the same type problem with different initial launch conditions. The processor creates another problem by executing steps 201–212 and 218–229 as previously described. Since an incorrect answer was supplied for the question posed at step 233, the processor proceeds from step 229 to step 230. In step 230, the processor determines the question answered by the student and returns to that question. In this instance, the processor in step 230 returns to execute the previously described steps 233–235. When the student inputs the correct answer as determined in step 235, the processor proceeds to step 237 and displays the next question asking for the horizontal component of the initial velocity.

After displaying the question in step 237, the processor in step 238 compares the user inputted answer with the correct answer calculated in step 205. In step 239, the processor determines whether the inputted answer equals the correct answer. If the student supplies an incorrect answer, the processor in step 240 displays the solved formula and correct answer on the display, and then returns to step 201 to create the same type problem with different initial launch conditions. The processor creates another problem by executing steps 201–212 and 218–229 as previously described. Since an incorrect answer was supplied for the question posed at step 237, the processor proceeds from step 229 to step 230. In step 230, the processor determines the question answered by the student and returns to that question. In this instance, the processor in step 230 returns to execute the previously described steps 237–239. When the student inputs the correct answer as determined in step 239, the processor proceeds to step 241 and displays the next question asking for the vertical component of the final velocity.

After displaying the question in step 241, the processor in step 242 compares the user inputted answer with the correct answer calculated in step 206. In step 243, the processor determines whether the inputted answer equals the correct answer. If the student supplies an incorrect answer, the processor in step 244 displays the solved formula and correct answer on the display, and then returns to step 201 to create the same type problem with different initial launch conditions. The processor creates another problem by executing steps 201–212 and 218–229 as previously described. Since an incorrect answer was supplied for the question posed at step 241, the processor proceeds from step 229 to step 230. In step 230, the processor determines the question answered by the student and returns to that question. In this instance, the processor in step 230 returns to execute the previously described steps 241–243. When the student inputs the correct answer as determined in step 243, the processor proceeds to step 245 and displays the next question asking for the time of flight for the projectile.

After displaying the question in step 245, the processor in step 246 compares the user inputted answer with the correct answer calculated in step 208. In step 247, the processor determines whether the inputted answer equals the correct answer. If the student supplies an incorrect answer, the processor in step 248 displays the solved formula and correct answer on the display, and then returns to step 201 to create the same type problem with different initial launch conditions. The processor creates another problem by executing steps 201–212 and 218–229 as previously described. Since an incorrect answer was supplied for the question posed at step 245, the processor proceeds from step 229 to step 230. In step 230, the processor determines the question answered by the student and returns to that question. In this instance, the processor in step 230 returns to execute the previously described steps 245–247. When the student inputs the correct answer as determined in step 247, the processor proceeds to step 249 and displays the next question asking for the horizontal distance traveled by the projectile.

After displaying the question in step 249, the processor in step 250 compares the user inputted answer with the correct answer calculated in step 209. In step 251, the processor determines whether the inputted answer equals the correct answer. If the student supplies an incorrect answer, the processor in step 252 displays the solved formula and correct answer on the display, and then returns to step 201 to create the same type problem with different initial launch conditions. The processor creates another problem by executing steps 201–212 and 218–229 as previously described. Since an incorrect answer was supplied for the question posed at step 249, the processor proceeds from step 229 to step 230. In step 230, the processor determines the question answered by the student and returns to that question. In this instance, the processor in step 230 returns to execute the previously described steps 249–251. When the student inputs the correct answer as determined in step 251, the processor proceeds to step 253 and displays the next question asking for the magnitude of final velocity along the flight path.

After displaying the question in step 253, the processor in step 254 compares the user inputted answer with the correct answer calculated in step 210. In step 255, the processor determines whether the inputted answer equals the correct answer. If the student supplies an incorrect answer, the processor in step 256 displays the solved formula and correct answer on the display, and then returns to step 201 to create the same type problem with different initial launch conditions. The processor creates another problem by executing steps 201–212 and 218–229 as previously described. Since an incorrect answer was supplied for the question posed at step 253, the processor proceeds from step 229 to step 230. In step 230, the processor determines the question answered by the student and returns to that question. In this instance, the processor in step 230 returns to execute the previously described steps 253–255. When the student inputs the correct answer as determined in step 255, the processor proceeds to step 257 and displays the next question asking for the approach angle of the projectile.

After displaying the question in step 257, the processor in step 258 compares the user inputted answer with the correct answer calculated in step 211. In step 259, the processor determines whether the inputted answer equals the correct answer. If the student supplies an incorrect answer, the processor in step 260 displays the solved formula and correct answer on the display, and then returns to step 201 to create the same type problem with different initial launch conditions. The processor creates another problem by executing steps 201–212 and 218–229 as previously described. Since an incorrect answer was supplied for the question posed at step 257, the processor proceeds from step 229 to step 230. In step 230, the processor determines the question answered by the student and returns to that question. In this instance, the processor in step 230 returns to execute the previously described steps 257–259. Once the student inputted answer equals the correct answer, the processor in step 259 proceeds to step 261.

In step 261, the processor queries the user if another tutorial is desired. The processor determines whether another tutorial is desired by the user in step 262. If the user indicates "yes" in response to the prompt in step 261, the processor returns to step 201 to execute the previously described steps. If the user indicates "no" in response to the prompt in step 261, the processor exits the random problem generator 1.

Although the present invention has been described in terms of the foregoing embodiment, such description has been for exemplary purposes only and, as will be apparent to those of ordinary skill in the art, many alternatives, equivalents, and variations of varying degrees will fall within the scope of the present invention. That scope accordingly is not to be limited in any respect by the foregoing description, rather, it is defined only by the claims that follow.

I claim:

1. A random problem generator, comprising:
   means for selecting a math or science related formula from a database of math or science related formulas;
   means for randomly generating an initial condition necessary to solve the selected math or science related formula; and
   means for generating a question relating the selected math or science related formula to the randomly generated initial condition.

2. The random problem generator according to claim 1 further comprising means for displaying the question relating the selected math or science related formula to the randomly generated initial condition.

3. The random problem generator according to claim 1 further comprising means for printing the question relating the selected math or science related formula to the randomly generated initial condition.

4. The random problem generator according to claim 1 further comprising means for generating an answer to the question relating the selected math or science related formula to the randomly generated initial condition.

5. The random problem generator according to claim 4 further comprising means for comparing an answer input by a user to the generated answer and means for displaying the question completely solved when the user input answer is incorrect.

6. A method of randomly generating problems, comprising the steps of:
   selecting a math or science related formula from a database of math or science related formulas;
   randomly generating an initial condition necessary to solve the selected math or science related formula; and
   generating a question relating the selected math or science related formula to the randomly generated initial condition.

7. The method according to claim 6 further comprising displaying the question relating the selected math or science related formula to the randomly generated initial condition.

8. The method according to claim 6 further comprising printing the question relating the selected math or science related formula to the randomly generated initial condition.

9. The method according to claim 6 further comprising generating an answer to the question relating the selected math or science related formula to the randomly generated initial condition.

10. The method according to claim 9 further comprising comparing an answer input by a user to the generated answer and displaying the question completely solved when the user input answer is incorrect.

11. A random problem generator for randomly generating chemical formula problems, comprising:
    means for randomly selecting a cation from a table of cations;
    means for retrieving the cation name from the table of cations;
    means for randomly selecting an anion from a table of anions;
    means for retrieving the anion name from the table of anions;
    means for balancing the charges of the cation and the anion;
    means for determining a subscript for the cation;
    means for determining a subscript for the anion;
    means for placing the cation and anion together to form a chemical formula;
    means for placing the cation name and anion name together to form a chemical name; and
    means for generating either a question supplying the chemical name and asking for the chemical formula or supplying the chemical formula and asking for the chemical name.

12. The random problem generator according to claim 11 wherein the means for balancing the charges of the cation and the anion, comprises:
   means for determining if the quantity of cations times the charge of the cation is greater than the quantity of anions times the charge of the anion;
   means for increasing the quantity of cations when the charge of the cation is not greater than the charge of the anion;
   means for increasing the quantity of anions when the charge of the cation is greater than the charge of the anion; and
   means for determining if the quantity of cations times the charge of the cation plus the quantity of anions times the charge of the anion equals zero.

13. The random problem generator according to claim 11 wherein the means for determining the subscript for the cation, comprises:
   means for determining if the quantity of cations equals one;
   means for including no subscript with the cation when the quantity of cations equals one;
   means for determining if the cation is monoatomic when the quantity of cations is greater than one;
   means for including with the cation a subscript equal to the quantity of cations when the cation is monoatomic;
   means for determining if the cation is polyatomic when the cation is not monoatomic; and
   means for placing parentheses around the cation and including with the cation a subscript equal to the quantity of the cations.

14. The random problem generator according to claim 11 wherein the means for determining the subscript for the anion, comprises:
   means for determining if the quantity of anions equals one;
   means for including no subscript with the anion when the quantity of anions equals one;
   means for determining if the anion is monoatomic when the quantity of anions is greater than one;
   means for including with the anion a subscript equal to the quantity of anions when the anion is monoatomic;
   means for determining if the anion is polyatomic when the anion is not monoatomic; and
   means for placing parentheses around the anion and including with the anion a subscript equal to the quantity of the anions.

15. The random problem generator according to claim 11 further comprising:
   means for retrieving an incorrect anion from the table of anions;
   means for retrieving an incorrect anion name from the table of anions;
   means for including a correct cation subscript with the correct cation;
   means for including a correct anion subscript with the incorrect anion;
   means for placing the correct cation and incorrect anion together to form a first incorrect chemical formula;
   means for placing the correct cation name and the incorrect anion name together to form a first incorrect chemical name.

16. The random problem generator according to claim 15 further comprising:

means for retrieving an incorrect cation from the table of cations;
   means for retrieving an incorrect cation name from the table of cations;
   means for including the correct cation subscript with the incorrect cation;
   means for including the correct anion subscript with the correct anion;
   means for placing the incorrect cation and correct anion together to form a second incorrect chemical formula;
   means for placing the incorrect cation name and the correct anion name together to form a second incorrect chemical name.

17. The random problem generator according to claim 16 further comprising:
   means for retrieving an incorrect cation from the table of cations;
   means for retrieving an incorrect cation name from the table of cations;
   means for retrieving an incorrect anion from the table of anions;
   means for retrieving an incorrect anion name from the table of anions;
   means for including the correct cation subscript with the incorrect cation;
   means for including the correct anion subscript with the incorrect anion;
   means for placing the incorrect cation and incorrect anion together to form a third incorrect chemical formula;
   means for placing the incorrect cation name and the incorrect anion name together to form a third incorrect chemical name.

18. The random problem generator according to claim 17 further comprising:
   means for determining if the correct quantity of cations equals the correct quantity of anions;
   means for increasing the quantity of anions by one when the correct quantity of cations equals the correct quantity of anions;
   means for swapping the correct quantity of cations with the correct quantity of anions when the correct quantity of cations does not equal the correct quantity of anions;
   means for determining the subscripts for the cation and anion; and
   means for placing the cation and anion together to form a fourth incorrect chemical formula.

19. The random problem generator according to claim 18 further comprising:
   means for adding a prefix to the correct anion name based on the quantity of anions to form an incorrect anion name;
   means for removing any Roman numeral designations from the correct cation name to form an incorrect cation name;
   means for placing the incorrect cation name and the incorrect anion name together to form an incorrect chemical name; and
   means for altering the suffix of the incorrect chemical name to form a fourth incorrect chemical name.

20. The random problem generator according to claim 19 further comprising means for developing a test question using the correct chemical formula and name and incorrect chemical formulas and names.

21. A method of randomly generating chemical formula problems, comprising the steps of:
   randomly selecting a cation from a table of cations;

retrieving the cation name from the table of cations;
randomly selecting an anion from a table of anions;
retrieving the anion name from the table of anions;
balancing the charges of the cation and the anion;
determining a subscript for the cation;
determining a subscript for the anion;
placing the cation and anion together to form a chemical formula;
placing the cation name and anion name together to form a chemical name; and
generating either a question supplying the chemical name and asking for the chemical formula or supplying the chemical formula and asking for the chemical name.

22. The method according to claim 21 wherein the step of balancing the charges of the cation and the anion, comprises the steps of:
determining if the quantity of cations times the charge of the cation is greater than the quantity of anions times the charge of the anion;
increasing the quantity of cations when the charge of the cation is not greater than the charge of the anion;
increasing the quantity of anions when the charge of the cation is greater than the charge of the anion;
determining if the quantity of cations times the charge of the cation plus the quantity of anions times the charge of the anion equals zero; and
repeating the preceding steps until the quantity of cations times the charge of the cation plus the quantity of anions times the charge of the anion equals zero.

23. The method according to claim 21 wherein the step of determining the subscript for the cation, comprises the steps of:
determining if the quantity of cations equals one;
including no subscript with the cation when the quantity of cations equals one;
determining if the cation is monoatomic when the quantity of cations is greater than one;
including with the cation a subscript equal to the quantity of cations when the cation is monoatomic;
determining if the cation is polyatomic when the cation is not monoatomic; and
placing parentheses around the cation and including with the cation a subscript equal to the quantity of the cations.

24. The method according to claim 21 wherein the step of determining the subscript for the anion, comprises the steps of:
determining if the quantity of anions equals one;
including no subscript with the anion when the quantity of anions equals one;
determining if the anion is monoatomic when the quantity of anions is greater than one;
including with the anion a subscript equal to the quantity of anions when the anion is monoatomic;
determining if the anion is polyatomic when the anion is not monoatomic; and
placing parentheses around the anion and including with the anion a subscript equal to the quantity of the anions.

25. The method according to claim 21 further comprising the steps of:
retrieving an incorrect anion from the table of anions;
retrieving an incorrect anion name from the table of anions;
including the correct cation subscript with the correct cation;
including the correct anion subscript with the incorrect anion;
placing the correct cation and incorrect anion together to form a first incorrect chemical formula;
placing the correct cation name and the incorrect anion name together to form a first incorrect chemical name.

26. The method according to claim 25 further comprising the steps of:
retrieving an incorrect cation from the table of cations;
retrieving an incorrect cation name from the table of cations;
including the correct cation subscript with the incorrect cation;
including the correct anion subscript with the correct anion;
placing the incorrect cation and correct anion together to form a second incorrect chemical formula;
placing the incorrect cation name and the correct anion name together to form a second incorrect chemical name.

27. The method according to claim 26 further comprising the steps of:
retrieving an incorrect cation from the table of cations;
retrieving an incorrect cation name from the table of cations;
retrieving an incorrect anion from the table of anions;
retrieving an incorrect anion name from the table of anions;
including the correct cation subscript with the incorrect cation;
including the correct anion subscript with the incorrect anion;
placing the incorrect cation and incorrect anion together to form a third incorrect chemical formula;
placing the incorrect cation name and the incorrect anion name together to form a third incorrect chemical name.

28. The method according to claim 27 further comprising the steps of:
determining if the correct quantity of cations equals the correct quantity of anions;
increasing the quantity of anions by one when the correct quantity of cations equals the correct quantity of anions;
swapping the correct quantity of cations with the correct quantity of anions when the correct quantity of cations does not equal the correct quantity of anions;
determining the subscripts for the cation and anion; and
placing the cation and anion together to form a fourth incorrect chemical formula.

29. The method according to claim 28 further comprising the steps of:
adding a prefix to the correct anion name based on the quantity of anions to form an incorrect anion name;
removing any Roman numeral designations from the correct cation name to form an incorrect cation name;
placing the incorrect cation name and the incorrect anion name together to form an incorrect chemical name; and
altering the suffix of the incorrect chemical name to form a fourth incorrect chemical name.

30. The method according to claim 29 further comprising the step of developing a test question using the correct chemical formula and name and incorrect chemical formulas and names.

* * * * *